(12) United States Patent
Kaneko et al.

(10) Patent No.: US 6,505,347 B1
(45) Date of Patent: Jan. 7, 2003

(54) CONTROL INFORMATION GENERATING APPARATUS FOR BROADCAST SYSTEM

(75) Inventors: Shigeki Kaneko, Yokohama (JP); Yoshiyasu Takeuchi, Tokyo (JP); Takeshi Nagao, Kawaguchi (JP); Hiroyoshi Ishibashi, Yokohama (JP); Masaaki Yoshikawa, Tokyo (JP); Ryota Tsukidate, Tokyo (JP); Toru Kawaguchi, Matsudo (JP); Aki Nakagawa, Fujisawa (JP); Tsutomu Shigesawa, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/136,961

(22) Filed: Aug. 20, 1998

(30) Foreign Application Priority Data

Aug. 27, 1997 (JP) .............................................. 9-231570
Dec. 9, 1997 (JP) .............................................. 9-354015

(51) Int. Cl.⁷ .................................................. G06F 3/00
(52) U.S. Cl. .......................................... 725/39; 725/50
(58) Field of Search ................................ 725/39, 46, 50

(56) References Cited

U.S. PATENT DOCUMENTS

| | | |
|---|---|---|
| 5,515,106 A | 5/1996 | Chaney et al. |
| 5,548,532 A | 8/1996 | Menand et al. |
| 5,619,274 A * | 4/1997 | Roop .......................... 348/461 |
| 5,631,693 A | 5/1997 | Wunderlich et al. |
| 5,659,350 A | 8/1997 | Hendricks et al. |
| 5,666,293 A * | 9/1997 | Metz ........................... 709/220 |
| 5,844,620 A * | 12/1998 | Coleman ..................... 348/461 |
| 6,137,549 A * | 10/2000 | Rasson ......................... 725/37 |

FOREIGN PATENT DOCUMENTS

| | | |
|---|---|---|
| EP | 0 692 914 A | 1/1996 |
| EP | 0 758 833 A | 2/1997 |
| JP | 8-289268 | 11/1996 |

* cited by examiner

Primary Examiner—Andrew Faile
Assistant Examiner—Hunter Lonsberry
(74) Attorney, Agent, or Firm—Lowe Hauptman Gilman & Berner, LLP

(57) ABSTRACT

A control information generating apparatus is provided which is used in broadcast systems designed to transmit audio and video signals and/or teletext signals together with video control information and program information in multiplexed form. The control information generating apparatus transmits EPG (Electronic Program Guide) information (i.e., control information) for transmission of the audio and video signals and includes a control information generating circuit and a control information outputting circuit. The control information generating circuit receives program schedule information on a program from a broadcast database to generate and output control information. The control information outputting circuit receives and output the control information to a multiplexer in which the control information and a data signal from an audio/video data transmitter are multiplexed and transmitted on a carrier wave.

35 Claims, 31 Drawing Sheets

TABLE 1

| Ch | Channel 5 | ID | Pro. Name | Video | Audio | Contents |
|---|---|---|---|---|---|---|
|  | 10:00 ~ 11:00 | 54 | News 10 | 1 | Jp-1 Eng. - 1 | Today's News |
| 5 | 11:00 ~ 11:30 | 55 | Today's Music | 1 | Stereo 1 | . . . |
|  | 11:30 ~ 13:00 | 60 | Baseball | 1 | Jp 2 | . . . |
|  | . . . |  |  |  |  |  |
| 6 | . . . |  |  |  |  |  |
|  | . . . |  |  |  |  |  |

FIG. 7

TABLE 2

| ID | 452 |
|---|---|
| Table ID | Table ID 40 Sub-table No. 5 |
| Duration | 1997/10/2 10:00.0 ~ 1997/10/2 11:30.30 |
| Output Cycle | 0.5 sec. |
| Output Data | Data in Sub-table No. 5 of Table ID40 |
| Next Table | 453 |

FIG. 8

TABLE 3

| Table Name | Data Contents | Number | Update | Cycle (sec.) |
|---|---|---|---|---|
| NIT | Network Infor. | 1 | Irregularity | 1 |
| CAT | CA Infor. | 1 | Irregularity | 1 |
| PAT | PMT | 1 | Irregularity | 0.1 |
| PMT | Stream Table of each Service | Number of services in TS | Pro. Exchange (~ one hour) | 0.1 |
| SDT | Service Table | Number of Services | Irregularity | 3 |
| PEIT | Present Pro. Directory | Number of Services | Pro. Exchange (~ one hour) | 1 |
| SEIT | Following Pro. Directory | Number of Services x4 | Every Day | 3 |
| XLT | Other Tables | Number of Services | Every 6 hours | 3 |
| Others |  |  |  |  |

FIG. 9

| Channel | 1(Sun.) | 2(Mon.) | 3(Tue.) | 4(Wed.) | 5(Thur.) | 6(Fri.) | 7(Sat.) | 8(Sun.) |
|---|---|---|---|---|---|---|---|---|
| 1 Channel | | | | | | | | |
| 2 Channel | | | | | | | | |
| 3 Channel | | | | | | | | |
| | | | | | | | | |

43 Event File for One Day

TABLE 4

| ID | 556 |
|---|---|
| Duration | 1997/10/2 10:00.0 ~ 1997/10/2 10:30.30 |
| Output Cycle | |
| Output Tables | Data in Sub-table No. 5 of Table ID40<br>Data in Sub-table No. 6 of Table ID40<br>Data in Sub-table No. 8 of Table ID42<br>Data in Sub-table No. 3 of Table ID43<br>Data in Sub-table No. 5 of Table ID55 |
| Next Table | 559 |

FIG. 15

TABLE 5

| Repeat Data Group | Repeat Interval [S] | Normal Repeat Interval [S] | SI/EPG Table Name |
|---|---|---|---|
| Group1 | 1-10 | 1 | NIT |
|  |  |  | CAT |
| Group2 | 0.1-1 | 0.1 | PMT |
| Group3 | 0.1 | 0.1 | PAT |
| Group4 | 1-10 | 3 | XLT |
| Group5 | 1-5 | 3 | SDT(A) |
| Group6 | 1-10 | 3 | SDT(O) |
| Group7 |  |  | Other Tables |
| Group8 | 1-400 | 100 | Other Tables |
| Group9 | 1-2 | 1 | PEIT(A) |
| Group10 | 1-10 | 5 | PEIT(O) |
| Group11 | 1-20 | 3 | SEIT |
| Group12 | 1-20 | 3 | Other Tables |

SDT(A): Service Description Table (Actual TS)
SDT(O): Service Description Table (Other TS)
PEIT(A): Present Following Event Information Table (Actual TS)
PEIT(O): Present Following Event Information Table (Other TS)

FIG. 16

Sub-table Data Element

| 455 |
|---|
| pId = 0 00   Table Id = 0 00 |
| 1998 10/1 10:00   199 10/1 15:00 |
| 0.5 sec |
| Data 455 |
|  |

Sub-table Data Element

| 456 |
|---|
| 0 00                0 00 |
| 1998 10/1 15:00   199 10/2 2:00 |
| 0.6 sec |
| Data 456 |
|  |

FIG. 20

FIG. 41
| TS | Control Info. Outputting Unit |
|---|---|
| 1 | 400a |
| 2 | 400b |
| 3 | 400c |
| ⋮ | ⋮ |
| TRAPON1 | CYCLE1=1000 | CYCLE2=100 | ・・・・ |
| TRAPON2 | CYCLE1=500 | CYCLE2=100 | ・・・・ |
| SERVICE100 | CYCLE1=2000 | CYCLE2=500 | ・・・・ |
| SERVICE120 | CYCLE1=1500 | CYCLE2=500 | ・・・・ |
FIG. 42
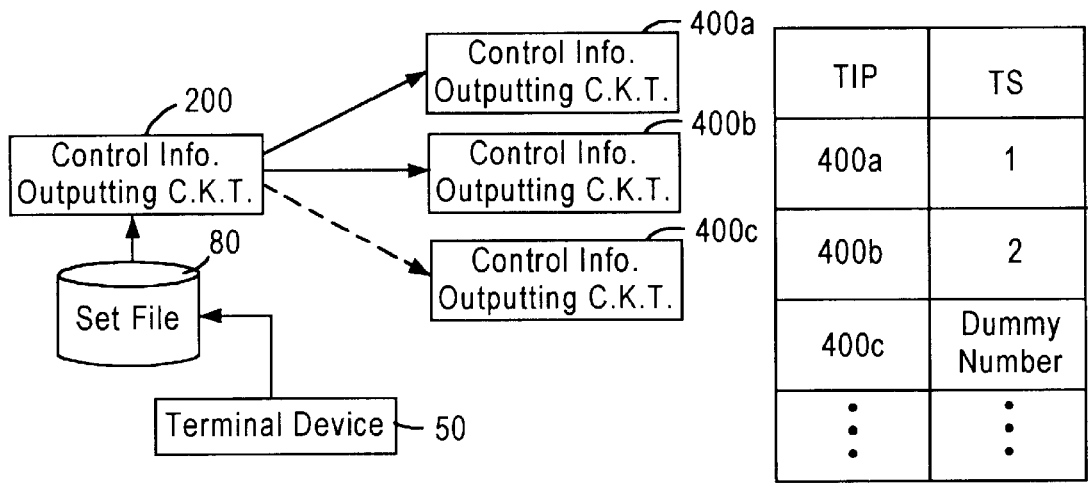
FIG. 43
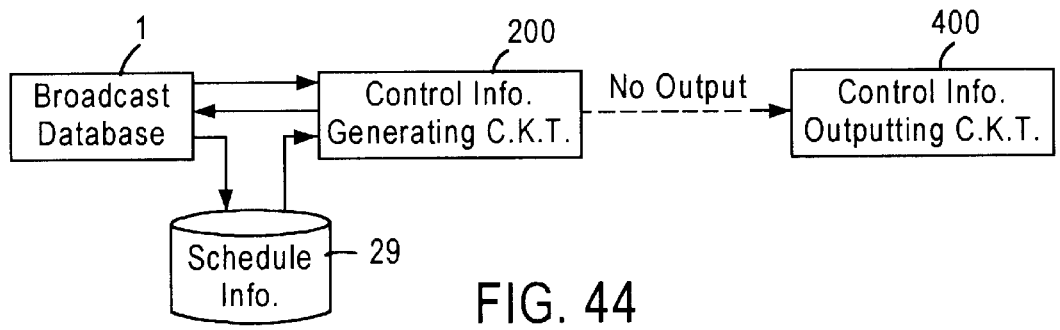
FIG. 44

CONTROL INFORMATION GENERATING APPARATUS FOR BROADCAST SYSTEM

BACKGROUND OF THE INVENTION

1. Technical Field of the Invention

The present invention relates generally to a control information generating apparatus for broadcast systems, and more particularly to a control information generating apparatus for broadcast systems which are designed to transmit audio and video signals and/or teletext signals together with video control information and program information in multiplexed form.

2. Background of Related Art

Usually, when transmitting television programs, a broadcasting station prepares and transmits control information, i.e., EPG (Electronic Program Guide) information for transmission of audio and video signals.

FIG. 1 shows a typical example of such a broadcast system which includes a broadcast database 1, an audio/video data transmitter 2, a control information generator 3, and a multiplexer 4. The broadcast database 1 stores therein television program information. The audio/video data transmitter 2 reads a program schedule and audio/video data out of the broadcast database 1 periodically and transmits them in a data stream form to the multiplexer 4. The control information generator 3 reads program schedule information out of the broadcast database 1, produces control information for each program contained in the program schedule information, and transmits it in a data stream form to the multiplexer 4. The multiplexer 4 multiplexes the audio/video data from the audio/video transmitter 2 and the control information from the control information generator 3 to output them on a broadcast wave.

The control information generator 3 includes, as shown in FIG. 2, a control data generating circuit 5. The control data generating circuit 5 consists of a schedule database 7, a sequential data generator 8, and an output circuit 9. The schedule database 7 stores therein the program schedule information read out of the broadcast database 1. The sequential data generator 8 controls reception of the program schedule information from the broadcast database 1 in the schedule database 7 and processes the information stored in the schedule database 7 in sequence to produce control data components. The output circuit 9 transmits the control data components to the multiplexer 4.

The output circuit 9 consists of a plurality of data output units (only three 9a, 9b, and 9c are shown in FIG. 2 for the brevity of illustration). FIG. 3 shows one of the data output units 9a to 9b which includes an input circuit 10 receiving the control data components coming from the sequential data generator 8, a storage device 11 storing therein the received control data, an output circuit 12 outputting the control data components stored in the storage device 11, and a scheduler 13 controlling reading of the control data components from the storage device 11.

The data output units 9a to 9c receive the control data components from the sequential data generator 8 and output them in parallel to the multiplexer 4. The storage device 11 of each of the data output units 9a to 9c stores the control data component as a plurality of tables (e.g., 400 tables: PAT, PMT0, PMT1, TMT2, PMT3, ...) and output the tables in response to a command from the scheduler 13.

The above conventional broadcast system, however, encounters the following drawback.

The control information generator 3 must receive a large amount of the program schedule information and perform in a CPU a large number of operations to generate the control data components, which will result in a delay in output from the CPU and also make it difficult to increase the accuracy of transmission cycles of the control data components. For example, when the number of tables stored in the storage device 11 exceeds 1,000, it will cause an operational load of the output circuit 9 to be increased, thus resulting in delay in output from the output circuit 9.

SUMMARY OF THE INVENTION

It is therefore a principal object of the present invention to avoid the disadvantages of the prior art.

It is another object of the present invention to provide a control information generating apparatus for broadcast systems which is capable of altering program control information without interrupting a system operation to output audio/video data.

It is a further object of the present invention to provide a control information generating apparatus for broadcast systems which is capable of altering a TV program schedule at regular intervals and taking measures to meet unexpected program change requirements.

According to one aspect of the present invention, there is provided a control information generating apparatus for use in a broadcast system including a broadcast database storing therein program information and an audio/video data transmitter. The control information generating apparatus receives a program schedule and audio/video data from the broadcast database and transmits a data signal thereof and a multiplexer and comprises: (a) a control information generating circuit which receives program schedule information on a program from the broadcast database to generate control information on a program of the program schedule information and outputs a signal of the control information; and (b) a control information outputting circuit which receives the signal of the control information from the control information generating circuit and outputs the control information to the multiplexer in which the control information and the data signal from the audio/video data transmitter are multiplexed.

In the preferred mode of the invention, the control information generating circuit includes an input circuit which receives the program schedule information from the broadcast database, a version generator which receives the program schedule information from the input circuit to generate table information and assigns a version number to the table information, a TS packetizing circuit which packetizes the table information outputted from the version generator, a bandwidth adjuster which determines a transmission cycle of the table information so that all the table information may be transmitted for adjusting a transmission bandwidth thereof, and an output circuit which outputs the table information to the control information outputting circuit.

The control information outputting circuit includes an input circuit which receives the control information outputted from the control information generating circuit, a storage device which stores the control information in grouped table forms, an output circuit which outputs the control information stored in the storage device, and a scheduler which controls timing where the control information is outputted from the storage device to the output circuit.

The program schedule information consists of a PSI element and an SI element which are transmitted independently from the broadcast database to the control information generating circuit.

The program schedule information is provided in units of a file containing programs for one day broadcasted through all services.

The version generator sections a schedule database prepared by the input circuit in units of a table to produce table information elements and assigns consecutive version numbers at least one to each of the table information elements. The version generator includes a version skip detecting circuit detecting a skip of the version numbers.

The control information outputting circuit may include a plurality of control information outputting units. The control information outputting units are controlled so that the control information being transmitted currently will be updated simultaneously at a switching time that is a current time plus a marginal time.

The bandwidth adjuster includes a bandwidth adjustment table for determining a bandwidth adjustable range and changing the degree of bandwidth adjustment according to a property of each table of the table information.

From some of the table information elements having the different version numbers which are to be transmitted within a given period of time, one having the greatest amount of data is extracted as an object of determination of the transmission cycle.

The control information generating circuit classifies the control information to be stored in the storage device of the control information outputting circuit into groups in units of a transmitted data element according to one of a transmission cycle and an information updating time.

The table information is supplied from the control information generating circuit in the grouped table form.

The storage device may include a pre-storage, a post-storage, and a table combiner. The pre-storage stores therein the table information in units of a table. The table combiner combines tables stored in the pre-storage into table groups a preselected time before the table groups are outputted from the output circuit. The post-storage stores therein the table groups provided by the table combiner.

The table combiner may combine some of tables into table groups a preselected time before all table groups are outputted from the output circuit.

The control information includes tables each consisting of sub-tables each consisting of sections. The transmitted data element in each of the groups consists of the sections having the same section number. The transmitted data elements are transmitted at given time intervals.

The output circuit includes a plurality of cues having different output priorities, respectively. Each cue stores therein the control information in a grouped table form. The output circuit reads tables out of one of the cues having a higher degree of output priority.

According to the second aspect of the invention, there is provided a control information generating apparatus for use in a broadcast system which comprises: (a) a control information generating circuit which receives program schedule information on a program to generate control information on the program and outputs a signal indicative of the control information, the control information generating circuit including an input circuit, a table preparing circuit, and an output circuit, the input circuit receiving the schedule information, the table preparing circuit preparing table information as the control information based on the program schedule information, the output circuit outputting a signal indicative of the table information; and (b) a control information outputting circuit including an input circuit, a version management circuit, a TS packetizing circuit, a bandwidth adjusting circuit, a storage device, a scheduler, and an output circuit, the input circuit receiving the signal indicative of the table information from the control information generating circuit, the version management circuit assigning a version number to the table information, the TS packetizing circuit packetizing the table information, the bandwidth adjusting circuit determining a transmission bandwidth and a transmission cycle of the table information, the storage device storing therein the table information in packet form, the scheduler controlling output timing with which the table information stored in the storage device is outputted from the output circuit according to the transmission cycle determined by the bandwidth adjusting circuit.

In the preferred mode of the invention, the program schedule information has areas for writing therein an alternation date on which the program schedule information was altered and a reception date on which the control information generating circuit received the program schedule information. The control information generating circuit looks up the program schedule information to know a newly altered portion of the program schedule information.

The table preparing circuit stores therein a version number-information element table listing a relation between version numbers and information elements of table information. When assigning the version number to the table information, the version management circuit looks up the version number-information element table stored in the table preparing circuit to obtain one of the information elements corresponding to the version number and to add the one of the information elements to one of information elements of the table information prepared by the table preparing circuit.

The information elements listed in the version number-information element table are cyclic redundancy checks.

The input circuit of the control information outputting circuit includes a memory management circuit which monitors an available memory capacity of the control information outputting circuit to provide a signal indicative thereof to the control information generating circuit. The control information generating circuit is responsive to the signal from the memory management circuit to supply the table information of an amount within the available memory capacity of the control information outputting circuit.

The output circuit of the control information generating circuit may be provided independently from the control information generating circuit as functioning as a control information transferring circuit which manages only data transfer from the control information generating circuit to the control information outputting circuit.

The control information outputting circuit may include a plurality of control information outputting units each designed to output the table information to a corresponding transponder. Each of the control information outputting units provides a signal to the control information generating circuit indicating completion of preparation of output of the table information. When the control information generating circuit has received the signals from all the control information outputting units, the control information generating circuit provides output enable signals to the control information outputting units to allow the control information outputting units to output the table information simultaneously.

The table information includes sub-tables each consisting of sections. The TS packetizing circuit assigns the sections of one of the sub-tables to different groups, respectively, and packetizes the table information in each of the groups.

The table preparing circuit may prepare the table information within a set time and also prepares spare table information on a subsequent program within an additional time following the set time. The control information outputting circuit stores the table information and the spare table information.

The table information includes a plurality of table information elements. A means may further be provided for designating one of the table information elements to be outputted from the control information outputting circuit.

The table information is formed with a plurality of transport streams. A means may further be provided for bearing a relation between one of the transport streams and each of the control information outputting units to specify one of the control information outputting units to which each of the transport streams is to be assigned.

A means may further be provided for determining cycles of transmission of the table information from the control information outputting units in units of a transponder.

A means may further be provided for determining bandwidths of transmission of the table information from the control information outputting units in units of a transponder.

A means may further be provided for determining bandwidths of transmission of the table information from the control information outputting units in units of a service.

A means may further be provided for supplying a dummy transport stream to one of the control information outputting units to prohibit output of the table information therefrom, thereby allowing a TV program schedule of another network to be transmitted.

The control information generating circuit receives the program schedule information from a broadcast database. The control information generating circuit is responsive to a non-output command signal inputted from an external device to prepare and return the table information to the broadcast database without outputting the table information to the control information outputting circuit.

The control information outputting circuit is also responsive to an output time designation signal inputted from an external device to transmit the control information at designated date and time.

An urgent alternation requesting circuit may further be provided which is responsive to an urgent alternation request signal outputted from the broadcast database to prohibit preparation of the table information in the control information generating circuit for altering the table information.

The table information may have free format regions.

The table information may also have table analysis information regions for storing therein table analysis information for analysis of table information elements of the table information prepared in free formats for allowing formats of all the table information elements to be determined through an external device without fixing the formats of all the table information elements in advance.

According to the third aspect of the invention, there is provided a control information generating apparatus for use in a broadcast system which comprises: (a) a control information generating circuit which receives program schedule information on a program to generate control information on the program and outputs a signal indicative of the control information, the control information generating circuit including an input circuit, a table preparing circuit, a version management circuit, a TS packetizing circuit, a bandwidth adjusting circuit, and an output circuit, the input circuit receiving the schedule information, the table preparing circuit preparing table information as the control information based on the program schedule information, the version management circuit assigning at least one of consecutive version numbers to the table information prepared by the table preparing circuit, the TS packetizing circuit packetizing the table information to which the version number is assigned, the bandwidth adjusting circuit determining a transmission bandwidth and a transmission cycle of the table information, the output circuit outputting the signal indicative of the table information; and (b) control information outputting circuits each including an input circuit, a storage device, a scheduler, and an output circuit, the input circuit receiving the signal indicative of the table information from the control information generating circuit, the storage device storing therein the table information inputted through the input circuit, the scheduler controlling output timing of the table information stored in the storage device from the output circuit according to the transmission cycle determined by the bandwidth adjusting circuit of the control information generating circuit.

The control information outputting circuits are provided one for each transponder.

When it becomes impossible for the version management circuit to know the version number to be assigned to the table information, the version management circuit may assign the consecutive version numbers, in sequence, to the table information from first one of the consecutive version numbers and output the table information through the output circuit in sequence.

The table preparing circuit prepares table information elements, in sequence, as the control information. The version management circuit assigns the consecutive version numbers, in sequence, at least one for each of the table information elements. The output circuit of the control information generating circuit outputs signals indicative of the table information elements to the control information outputting circuits. When a version number skip has occurred when the version management circuit assigns the version numbers to the table information elements, the version management circuit determines the greater of a version number assigned to the table information element that was last successful in being supplied to the control information outputting circuits and a version number following omitted one of the consecutive version numbers as a maximum value and the smaller thereof as an initial value and reassigns ones of the consecutive version numbers between the initial value and the maximum value, in sequence, to one of the table information elements when the version number skip has occurred.

The version management circuit determines a period of time during which it is possible for the input circuit of each of the control information outputting circuits to receive the table information element to which one following a version number assigned to the information element being received currently by the input circuit is assigned, the version management circuit determines that a version number skip will occur in the table information elements when outputted from the output circuit of each of the control information outputting circuits if the input circuit has not received within the determined period of time the table information element to which the one following the version number assigned to the information element being received currently by the input circuit is assigned.

The version management circuit determines a period of time during which it is possible for the input circuit of each of the control information outputting circuits to receive the table information element to which one following a version number assigned to the information element being received currently by the input circuit is assigned, the output circuit of the control information generating circuit may determine that a version number skip will occur in the table information elements when outputted from the output circuit of each of the control information outputting circuits if the output circuit of the control information generating circuit has not outputted within the determined period of time the table information element to which the one following the version number assigned to the information element being received currently by the input circuit of each of the control information outputting circuits is assigned.

The table information includes sub-tables each consisting of sections. The TS packetizing circuit assigns the sections of one of the sub-tables to different groups, respectively, and packetizes the sections in each of the groups.

The scheduler of each of the control information outputting circuits ensures minimum transmission intervals at which the table information is transmitted from each of the control information outputting circuits in units of the groups.

The sections of the sub-tables are grouped in units of a section number.

The TS packetizing circuit is designed to determine whether the table information has versions greater than a given value or not.

When it is determined that the table information has the versions greater than the given value, the TS packetizing circuit provides a packetizing schedule to each of the control information outputting circuits without packetizing the table information. Each of the control information outputting circuits packetizes the information table according to the packetizing schedule.

The TS packetizing circuit may assign the sections of the sub-tables to different groups in units of a transport stream and packetizes the sections in each of the groups.

The table preparing circuit may prepare the table information within a set time and also prepare spare table information on a subsequent program within an additional time following the set time. Each of the control information outputting circuits stores the table information and the spare table information.

The table information includes a plurality of table information elements. A means may further be provided for designating one of the table information elements to be outputted from each of the control information outputting circuits.

The table information is formed with a plurality of transport streams. A means may further be provided for bearing a relation between one of the transport streams and each of the control information outputting circuits to specify one of the control information outputting circuits to which each of the transport streams is to be assigned.

The control information outputting circuits are provided one for each transponder. A means may further be provided for determining cycles of transmission of the table information from the control information outputting circuits in units of a transponder.

A means may further be provided for determining bandwidths of transmission of the table information from the control information outputting circuits in units of a transponder.

A means may further be provided for determining bandwidths of transmission of the table information from the control information outputting circuits in units of a service.

A means may further be provided for supplying a dummy transport stream to one of the control information outputting circuits to prohibit output of the table information therefrom, thereby allowing a TV program schedule of another network to be transmitted.

The control information generating circuit receives the program schedule information from a broadcast database. The control information generating circuit is responsive to a non-output command signal inputted from an external device to prepare and return the table information to the broadcast database without outputting the table information to the control information outputting circuits.

Each of the control information outputting circuits is responsive to an output time designation signal inputted from an external device to transmit the control information at designated date and time.

An urgent alternation requesting circuit may further be provided which is responsive to an urgent alternation request signal from the broadcast database to prohibit preparation of the table information in the control information generating circuit for altering the table information.

The table information has free format regions.

The table information has table analysis information regions for storing therein table analysis information for analysis of table information elements of the table information prepared in free formats for allowing formats of all the table information elements to be determined through an external device without fixing the formats of all the table information elements in advance.

According to the fourth aspect of the invention, there is provided a control information generating apparatus for use in a broadcast system which comprises: (a) a main control information generating circuit which receives program schedule information on a program from a broadcast database to generate control information on the program and outputs a signal indicative of the control information, the control information generating circuit including an input circuit, a table preparing circuit, and an output circuit, the input circuit receiving the schedule information, the table preparing circuit preparing table information as the control information based on the program schedule information, the output circuit outputting a signal indicative of the table information; (b) a sub-control information generating circuit which receives the program schedule information from the broadcast database to generate the control information and outputs a signal indicative of the control information, the control information generating circuit including an input circuit, a table preparing circuit, and an output circuit, the input circuit receiving the schedule information, the table preparing circuit preparing table information as the control information based on the program schedule information, the output circuit outputting a signal indicative of the table information; (c) a main control information outputting circuit including an input circuit, a common version management circuit, a TS packetizing circuit, a bandwidth adjusting circuit, a storage device, a scheduler, and an output circuit, the input circuit receiving the signals indicative of the table information from the main and sub-control information generating circuits, the common version management circuit assigning a version number to the table information, the TS packetizing circuit packetizing the table information, the bandwidth adjusting circuit determining a transmission bandwidth and a transmission cycle of the table information, the storage device storing therein the table information in packet form, the scheduler controlling output timing of the table information stored in the storage device from the output circuit according to the transmission cycle determined by the bandwidth adjusting circuit; and (d) a sub-control information outputting circuit including an input circuit, the common version management circuit, a TS packetizing circuit, a bandwidth adjusting circuit, a storage device, a scheduler, and an output circuit, the input circuit receiving the signal indicative of the table information from the control information generating circuit, the TS packetizing circuit packetizing the table information, the bandwidth adjusting circuit determining a transmission bandwidth and a transmission cycle of the table information, the storage device storing therein the table information in packet form, the scheduler controlling output timing of the table information stored in the storage device from the output circuit according to the transmission cycle determined by the bandwidth adjusting circuit.

According to the fifth aspect of the invention, there is provided a control information generating apparatus for use in a broadcast system which comprises: (a) a control information generating circuit which receives program schedule information on a program from a broadcast database to generate control information on the program and outputs a signal indicative of the control information, the control information generating circuit including an input circuit, a table preparing circuit, a common version management circuit, a TS packetizing circuit, a bandwidth adjusting circuit, and an output circuit, the input circuit receiving the schedule information, the table preparing circuit preparing table information as the control information based on the program schedule information, the version management circuit assigning at least one of consecutive version numbers to the table information prepared by the table preparing circuit, the TS packetizing circuit packetizing the table information to which the version number is assigned, the bandwidth adjusting circuit determining a transmission bandwidth and a transmission cycle of the table information, the output circuit outputting the signal indicative of the table information; (b) a sub-control information generating circuit which receives the program schedule information from the broadcast database to generate the control information on the program and outputs a signal indicative of the control information, the control information generating circuit including an input circuit, a table preparing circuit, the common version management circuit, a TS packetizing circuit, a bandwidth adjusting circuit, and an output circuit, the input circuit receiving the schedule information, the table preparing circuit preparing table information as the control information based on the program schedule information, the TS packetizing circuit packetizing the table information to which the version number is assigned by the common version management circuit, the bandwidth adjusting circuit determining a transmission bandwidth and a transmission cycle of the table information, the output circuit outputting the signal indicative of the table information; (c) a main control information outputting circuit including an input circuit, a storage device, a scheduler, and an output circuit, the input circuit receiving the signals indicative of the table information from the main and sub-control information generating circuits, the storage device storing therein the table information inputted through the input circuit, the scheduler controlling output timing of the table information stored in the storage device from the output circuit according to the transmission cycle determined by the bandwidth adjusting circuit of the control information generating circuit; and (d) a sub-control information outputting circuit including an input circuit, a storage device, a scheduler, and an output circuit, the input circuit receiving the signals indicative of the table information from the main and sub-control information generating circuits, the storage device storing therein the table information inputted through the input circuit, the scheduler controlling output timing of the table information stored in the storage device from the output circuit according to the transmission cycle determined by the bandwidth adjusting circuit of the control information generating circuit.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only. in the drawings:

FIG. 7 is a table 1 which lists an example of a program schedule;

FIG. 8 is a table 2 which lists an example of a table data structure;

FIG. 9 is a table 3 which lists types of table;

FIG. 15 is a table 4 which lists an example of a table group;

FIG. 16 is a table 5 which lists an example of types of table group;

FIG. 20 is an illustration which shows an example of PAT group data;

FIG. 41 is an illustration which shows a transport stream-assigning file used in set files shown in FIG. 39;

FIG. 42 is an illustration which shows a transmission cycle file used in set files shown in FIG. 39;

FIG. 43 is an illustration which shows a dummy TS file which is one of set files of FIG. 39 connected to a control information generating circuit;

FIG. 44 is an illustration which shows a first modification of the seventh embodiment;

DESCRIPTION OF THE PREFERRED EMBODIMENT

Figure 1:
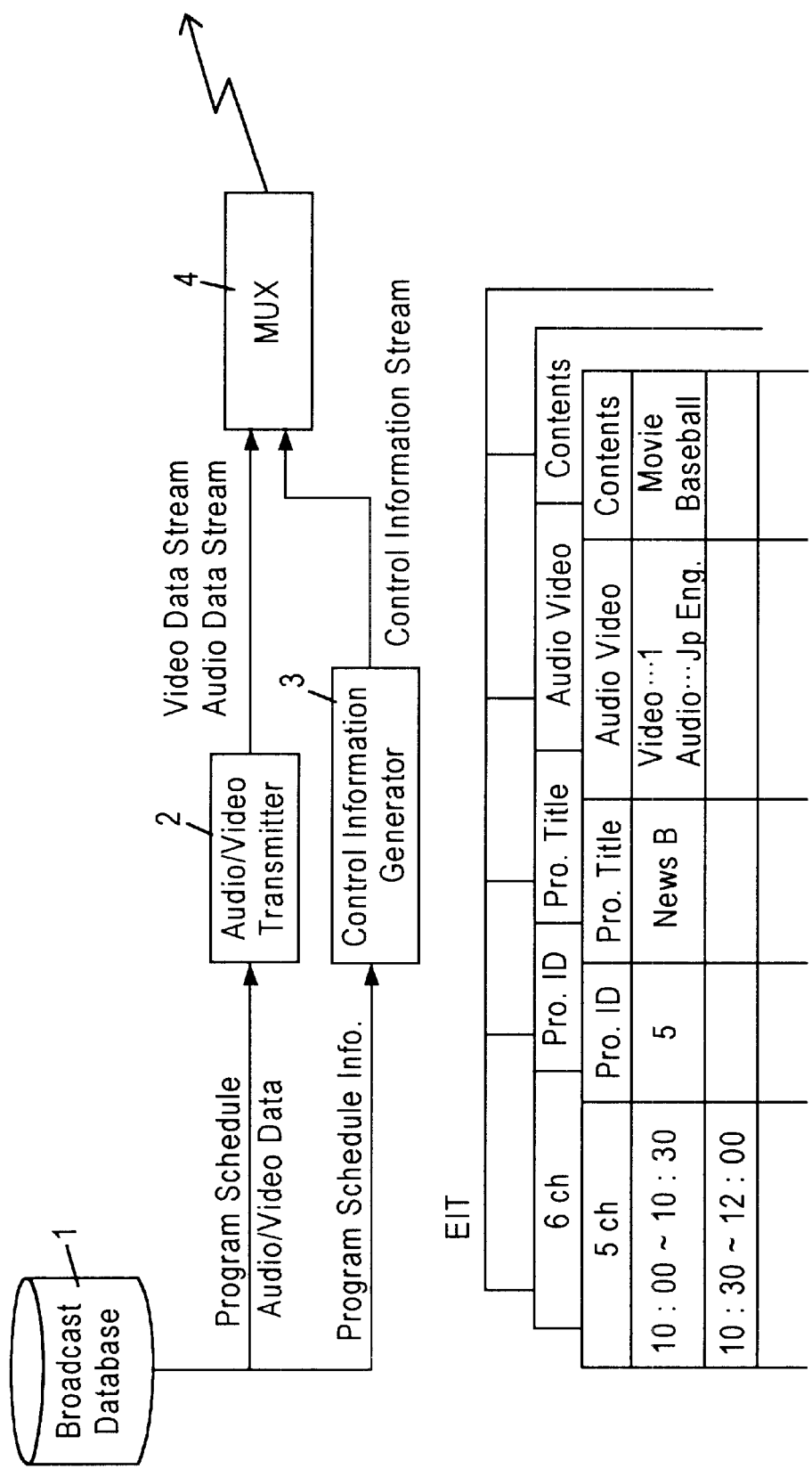
FIG. 1 is a block diagram which shows a conventional broadcast system.
Figure 2:
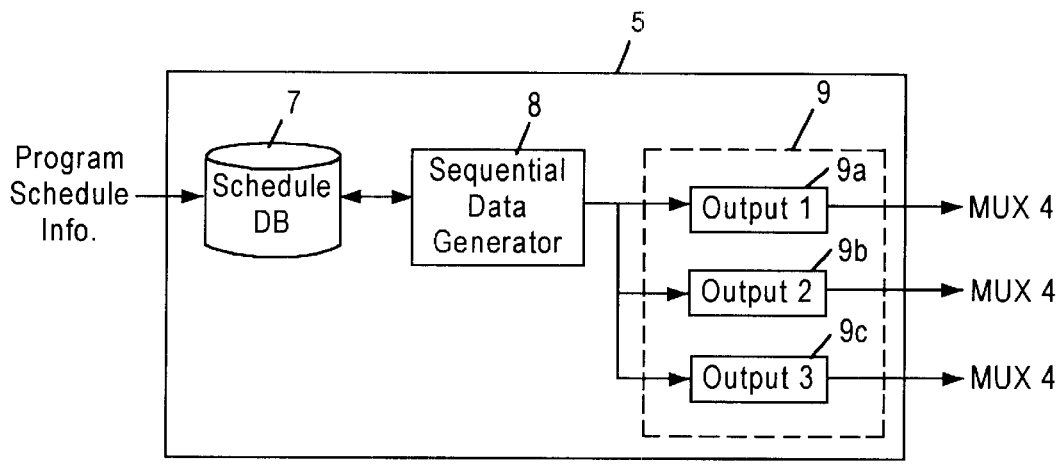
FIG. 2 is a block diagram which shows a circuit structure of a control information generator in the broadcast system of FIG. 1.
Figure 3:
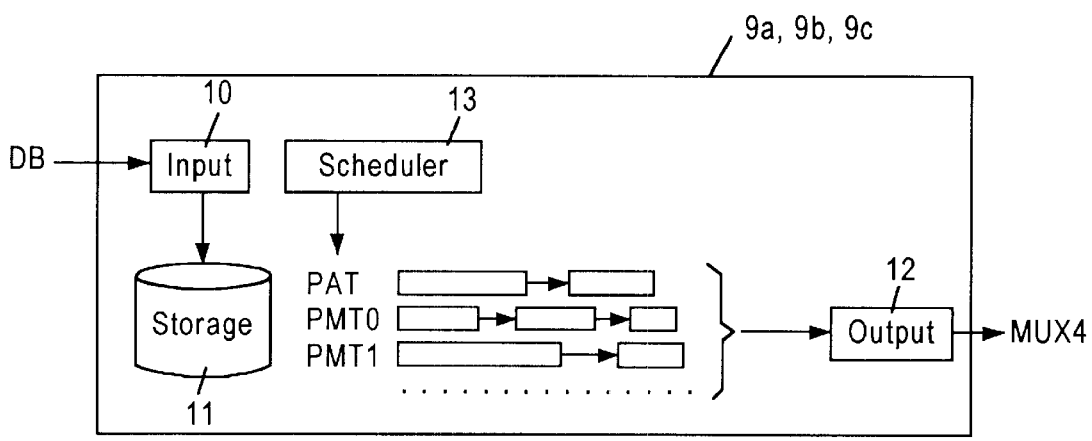
FIG. 3 is a block diagram which shows a circuit structure of an output circuit in the control information generator of FIG. 2.
Figure 4:
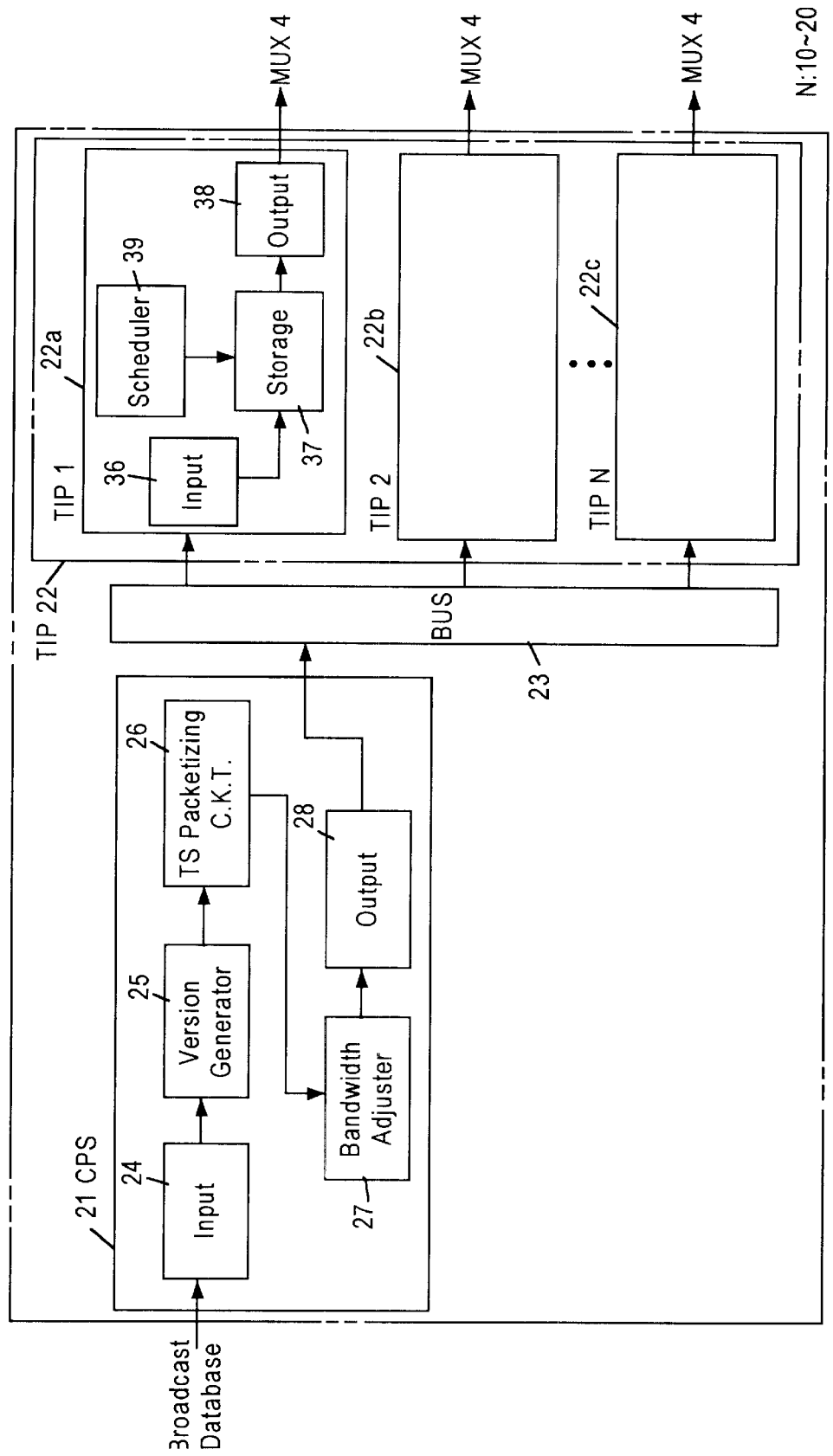
FIG. 4 is a block diagram which shows a control information generator for use in a broadcast system according to the first embodiment of the invention.

Referring now to the drawings, particularly to FIG. 4, there is shown a control information generator 20 according to the first embodiment of the invention which is used in the broadcast system, as discussed in the introductory part of this application with reference to FIGS. 1 to 3, in place of the control information generator 3.

The control information generator 20 includes generally a control data generator 21, a control data outputting circuit 22, a bus 23. The bus 23 connects the control data generator 21 and the control data outputting circuit 22 in a network to control transmission of data therebetween. The control data generator 21 serves as a compiler system which will also be referred to as a CPS below. The control data outputting circuit 22 serves as a transmission information processor which will also be referred to as a TIP below.

Figure 5:
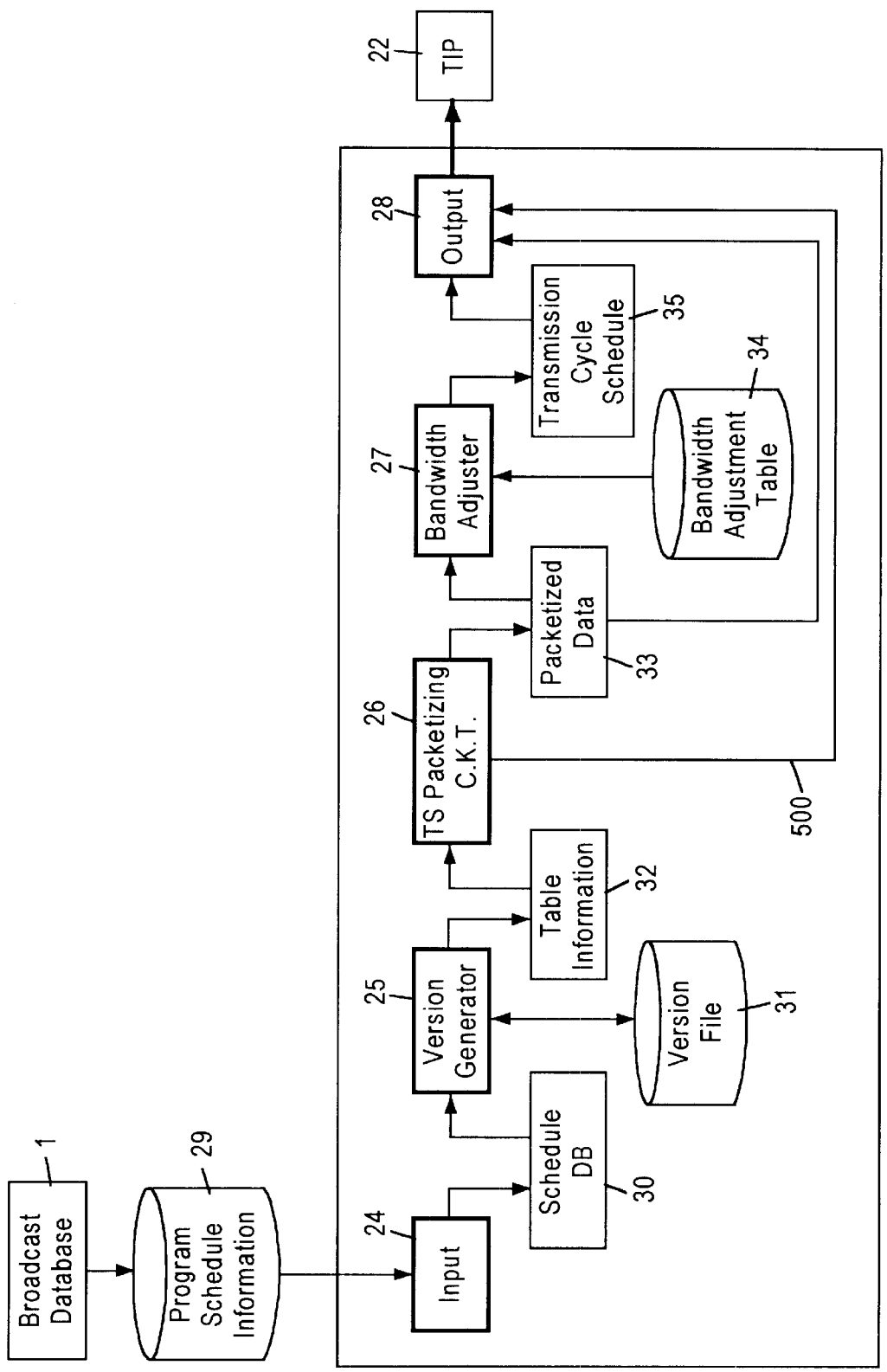
FIG. 5 is a block diagram which shows a control data generator of the control information generator of FIG. 4.

The control data generator 21 includes, as clearly shown in FIG. 5, an input circuit 24, a version generator 25, a TS packetizing circuit 26, a bandwidth adjuster 27, and an output circuit 28.

The input circuit 24 receives program schedule information 29 from the broadcast database 1 and prepares a schedule database 30. The version generator 25 reads the program schedule information out of the schedule database 30 to produce table information 32 and assigns a version number thereto. The TS packetizing circuit 26 translates the table information 32 into a data structure required for database transmission to produce packetized data 33 which is, in turn, sent to the bandwidth adjuster 27 and the output circuit 28. The bandwidth adjuster 27 adjusts or determines a cycle of output of the packetized data 33 from the control data outputting circuit 22 so that all the table information element 32 can be transmitted completely in a desired transmission bandwidth (i.e., at a desired data rate) by look-up using a bandwidth adjustment table 34 and prepares a transmission cycle schedule 35. The output circuit 28 outputs the packetized data 33 and the transmission cycle schedule 35 to the control data outputting circuit 22 as control data on a program (i.e., Electronic Program Guide information).

The control data outputting circuit 22 consists of a plurality of control data outputting units TIP1 to TIPN (only three 22a, 22b, and 22c are shown for the brevity of illustration) one for each transport stream (TS). Typically, the number of control data outputting units TIP1 to TIPN is 10 to 20. Each of the control data outputting units 22a to 22c includes an input circuit 36, a storage device 37, an output circuit 38, and a scheduler 39. The input circuit 26 receives the control data from the control data generator 21. The storage device 37 stores therein the received control data. The output circuit 38 outputs the control data to the multiplexer 4. The scheduler 39 controls output timing (i.e., an output interval) of the control data from the storage device 37 to the output circuit 38 according to the transmission cycle schedule 35.

Figure 6A:
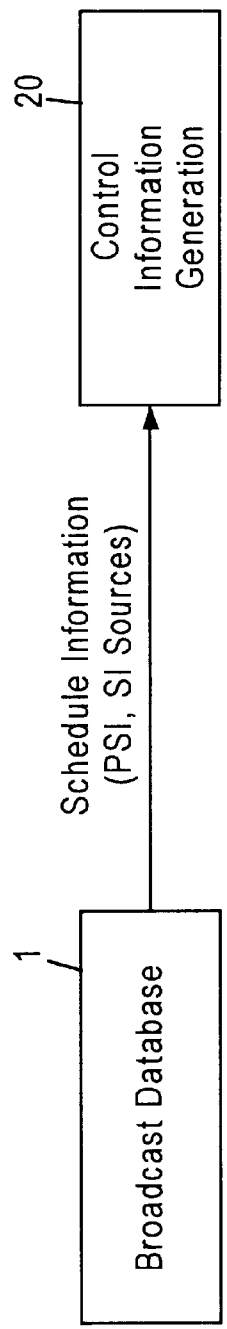
FIGS. 6(a) and 6(b) are block diagram which show examples of transmission of program schedule information from a broadcast database to a control information generator.
Figure 6B:
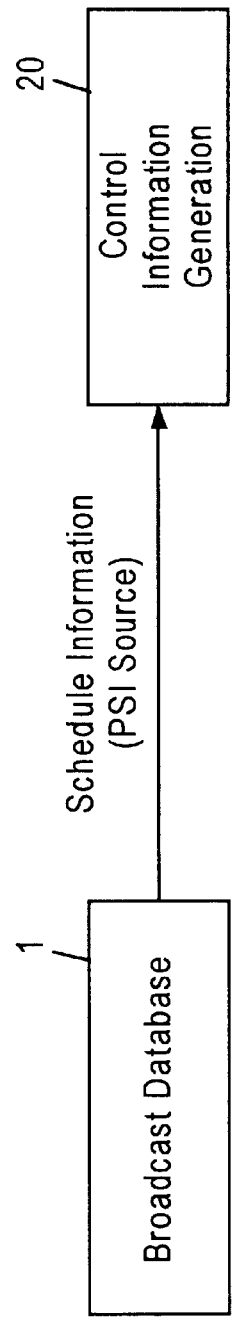

FIGS. 6(a) and 6(b) show examples of transmission of the program schedule information 29 from the broadcast database 1 to the control information generator 20.

The broadcast database 1 may input, as shown in FIG. 6(a), both a PSI (Program Specific Information: MPEG2 control tables) source and an SI (Service Information: DVB program information tables) source into the control information generator 20 or alternatively input, as shown in FIG. 6(b), only the PSI source into the control information generator 20. In the latter case, the input circuit 24 of the control data generator 21 supplies only the PSI source to the version generator 25.

In operation, the broadcast database 1 holds therein information about a program schedule (i.e., program information and a broadcasting schedule) and output it to the audio/video (AV) data transmitter 2 and the control information generator 20 periodically. FIG. 7 is table 1 listing, as an example of the program schedule, a PEIT (Present-following Event Information Table). Assume that a program of the channel 5 is transmitted to a specified transponder through the control data outputting unit 400a (TIP1). The news is to be aired from 10:00 to 11:00. The control data generator 21 prepares a table listing information on the news and transmits it in packetized form from an output terminal (communicating with the TIP1) at or immediately before 10:00. The TIP 1 outputs data stored in the storage device 37 to the multiplexer 4 from 10:00 to 11:00 in a cycle of, for example, 1 sec., as specified by the bandwidth adjuster 27. Similarly, tables listing information on other programs are prepared and accumulated prior to updating the programs and then transmitted for required periods of time, respectively. The AV data transmitter 2 converts audio/video data into MPEG2 transport stream packets according to the program schedule and transmits them to the multiplexer 4. The control information generator 20 produces MPEG2 control tables (i.e., PSI tables) and DVB program information tables (i.e., SI tables) according to the program information and the broadcasting schedule and translates them into transport stream packets which are, in turn, transmitted to the multiplexer 4. The multiplexer 4 multiplexes both the transport stream packets from the A/V data transmitter 2 and the control information generator 20 to produce an MPEG2transport stream (TS) which is, in turn, broadcasted through an uplink device.

The control information generator 20 is used with, for example, a digital satellite broadcasting SI/EPG system below.

Network: 1
TS: 20
Service: 100
The control data generator 21 prepares tables, as shown below, at a time.
EPG/SI Tables for 2-day broadcasting
TV program Schedule for 7 days including that day to be carried on an EPG (Electronic Program Guide)

A typical example of table specifications or data structure of a table prepared by the control data generator 21 is shown in FIG. 8. A transmission cycle of 0.5 sec. is a cycle of transmission of this table as determined by the bandwidth adjuster 27. The total number of tables is about 1000. Basically, each transport stream (TS) contains common tables (NIT, CAT, etc.), information about the TS (PAT, PMT, actual-SDT, actual -PEIT, actual-SEIT, etc.), and information about other transponders. These tables and contents thereof are exemplified in table 3 of FIG. 9.

The operation of the control data generator 21 will be described below.

Figures 10, 11:
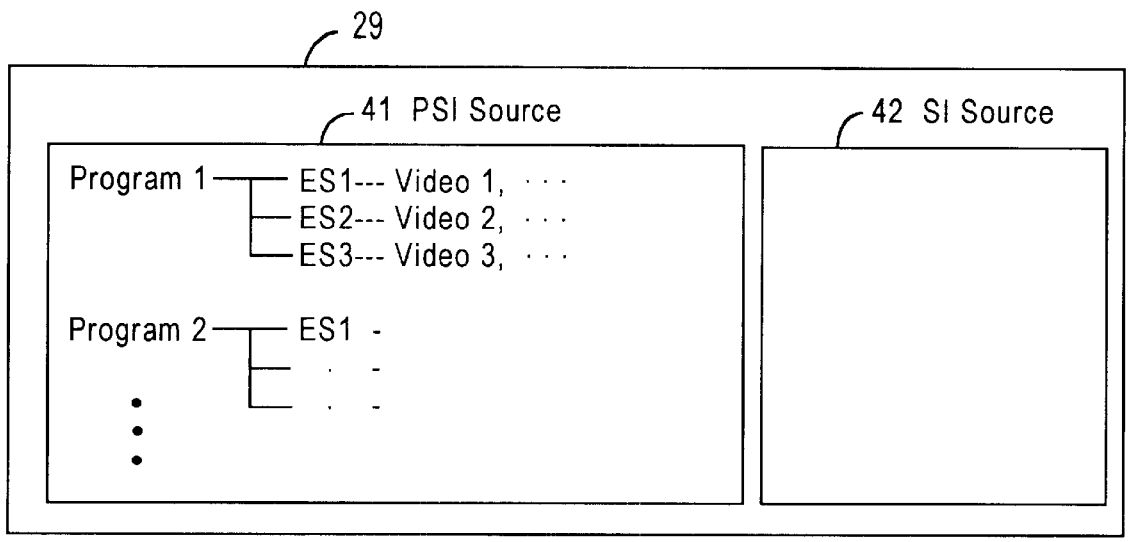
FIG. 10 is an illustration which shows PSI (Program Specific Information) and SI (Service Information) to be transmitted to the control information generators in FIGS. 6(a) and 6(b)
FIG. 11 is an illustration which shows event files provided in units of one day.

The input circuit 24 receives the program schedule information 29 from the broadcast database 1. When the program schedule information 29 does not contain, as shown in FIG. 10, data (i.e., SI source 42) required to prepare SI (Service Information) at all, the input circuit 24 stores only data (i.e., PSI source 41) required to prepare PSI (Program Specific Information) and a flag indicative thereof in the schedule database 30. The version generator 25 monitors the flag in the database 30 to determine whether the inputted schedule information 29 contains both the SI source 42 and the PSI source 41, as shown in FIG. 6(a), or only the PSI source 41, as shown in FIG. 6(b). If both the PSI source 41 and the SI source 42 are stored in the database 30, the version generator 25 produces both the PSI and SI. Alternatively, if the SI source 42 is not stored in the database 30, the version generator 25 produces only the PSI without providing dummy SI which is empty.

The input circuit 24 prepares the event information in units of a file, as indicated at 43 in FIG. 11, containing programs for one day broadcasted through all services. This prevents the same event information from being transmitted several times. Additionally, even if a program is changed, it is easy to know whether it is a today's program or a future program. The input circuit 24 adds to the schedule database 30 priority information (e.g., a priority flag) on whether the changed program is to be processed immediately or not. The input circuit 24 also produces an alternation file which stores only altered part of the file (i.e., the changed program) and transmits it to the version generator 25, thereby allowing the event information to be changed in units of a program, resulting in an increase in processing speed of the system.

Figure 12:
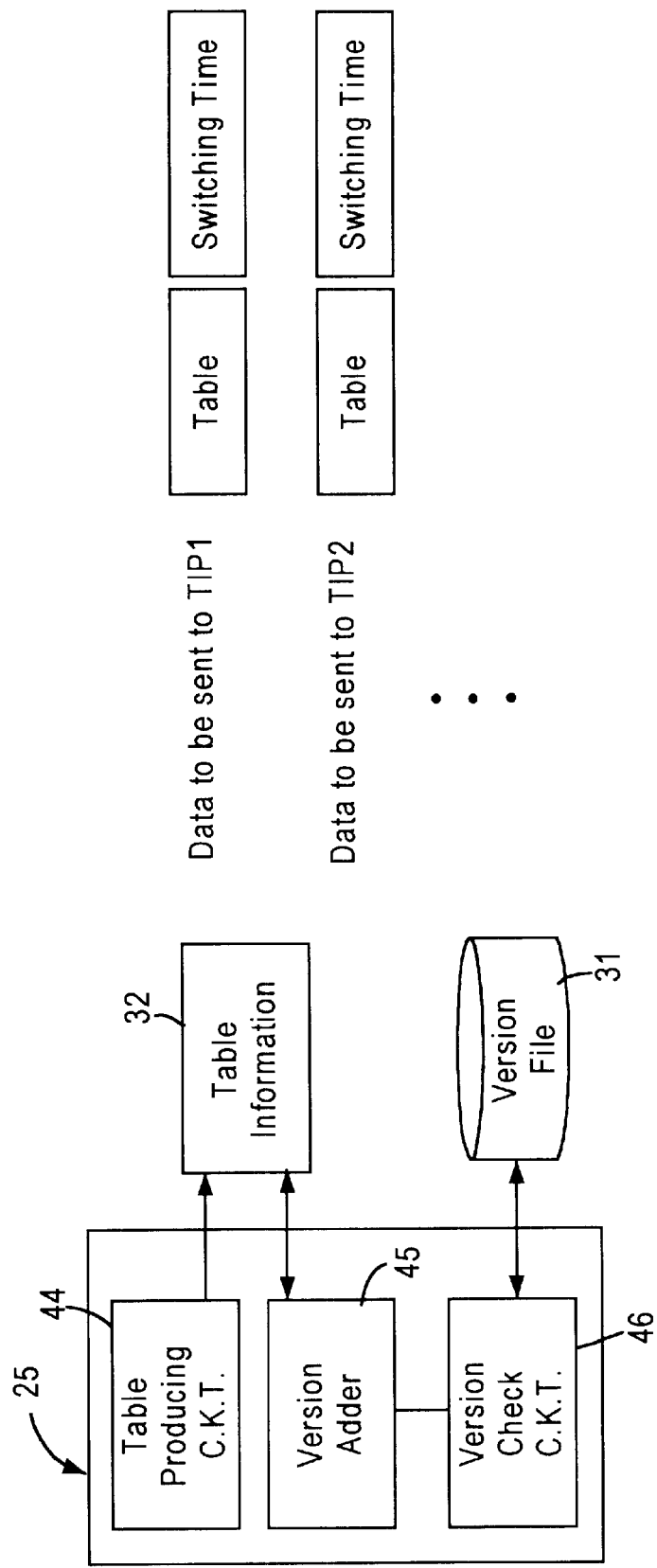
FIG. 12 is a block diagram which shows a circuit structure of a version generator of the control information generator in FIG. 4.

The version generator 25 includes, as shown in FIG. 12, a table producing circuit 44 preparing the table information 32 in sequence, a version adder 45 adding or assigning a version number to the table information element 32, and a version check circuit 46 checking a skip in consecutive version numbers. When the program information and the broadcasting schedule are inputted to the input circuit 24, the table producing circuit 44 prepares PSI/SI table data (i.e., the table information 32). Typically, table data for two days are produced at a scheduled time (e.g., 23:00) every day. Half of the table data is redundant. The version check circuit 46 checks a skip of a version number (hereinafter, referred to as a version skip). If the version skip is detected, consecutive version numbers are reassigned from the skipped number, thereby allowing a receiver to receive all required tables.

The operation of the version generator 25 will be described in detail with reference to FIG. 13. It is assumed that the data 47 is current data that is being transmitted from the control data outputting circuit 22 and contains data elements to which version numbers 1 to 5 are assigned, while the data 48 is altered or new data and contains data elements to which version numbers 1 to 8 are assigned. It is also assumed that the old data 47 is to be switched to the new data 48 at time t1, but the transmission of the new data 48 from the control information outputting unit 22a has been delayed for some reason. Regardless of such transmission delay, it is possible for the receiver to receive the data elements of the new data 48 up to the version number 4 because they fall within a range of version numbers of the current data 47 plus one (1). It is, however, impossible for the receiver to receive the data elements of the new data 48 following the version number 4 because they are out of the range of version numbers of the current data 47 plus one (1). Therefore, if the old data 47 is switched with the new data 48 after the new data 48 has changed from the version number 4 to 5, it will cause the version skip to occur, thereby precluding the receiver from receiving the new data 48. In order to monitor such a version skip, the version check circuit 46 stores the version numbers already used in the current data 47 as the version file 31.

Upon input of the new data 48, the version generator 25 compares the version numbers used in the current data 47 and the version numbers used in the new data 48 by look-up using the version file 31 to detect the version skip.

When it is required to update data being transmitted currently from the control information outputting circuit 20, the time that is the current time plus a preselected marginal time may be determined as a switching time at which the data is to be updated simultaneously through all the control information outputting units 22a to 22c, thereby avoiding the mismatching of data contents between transponders.

The TS packetizing circuit 26 formats the version number-assigned table information 32 in a preselected manner and produces MPEG2-TS packets which are, in turn, sent to the bandwidth adjuster 27.

The bandwidth adjuster 27 has the bandwidth adjustment table 34, as shown in FIG. 5, for determining a bandwidth adjustable range and a bandwidth adjustment unit according to the type of a table. This allows the transmission cycle of each table to be determined effectively, thereby ensuring a minimum transmission cycle of each table.

For example, PAT (Program Association Table) and PMT (Program Map Table) in PSI of MPEG2 are tables which are captured by a receiver each time a channel is changed and need to be transmitted with high accuracy. CLT (Collection List Table) listing collection information is not referred to frequently and needs not be transmitted with high accuracy. Based on the frequency of such table references, a minimum value, a maximum value, a default value, and a bandwidth adjustment unit of the transmission cycle of each table are determined. Specifically, the bandwidth adjustment unit of the transmission cycle of PAT and PMT is set narrower, while the bandwidth adjustment unit of the transmission cycle of CLT is set wider. If the transmission cycles of all tables are set to a default value, so that they are out of a desired bandwidth, then the transmission cycles of the respective tables are prolonged in the bandwidth adjustment unit thereof in the order in which the tables are allowed to be referred to at lower frequencies. This ensures the transmission cycles of the tables which are required to be referred to at high frequencies.

The determination of the transmission cycle of the tables may be accomplished in the following manner.

Some of the tables to be transmitted in sequence are grouped together, and one of the grouped tables having the most packets is extracted for an object of determination of the transmission cycle. This results in an decreased number of objects used to determine the transmission cycle, thereby improving an operation speed of the control data generator 21 and also decreases the number of times the bandwidth or transmission cycle is to be changed, thus decreasing an operation load of the control data outputting circuit 22.

Alternatively, from some of data elements (i.e., collections of sections to which the same version numbers are assigned, respectively) of each sub-table to be transmitted within a given period of time, one having the greatest amount of data is selected for an object of determination of the transmission cycle, which will be described in detail below with reference to FIG. 14.

Figure 14:
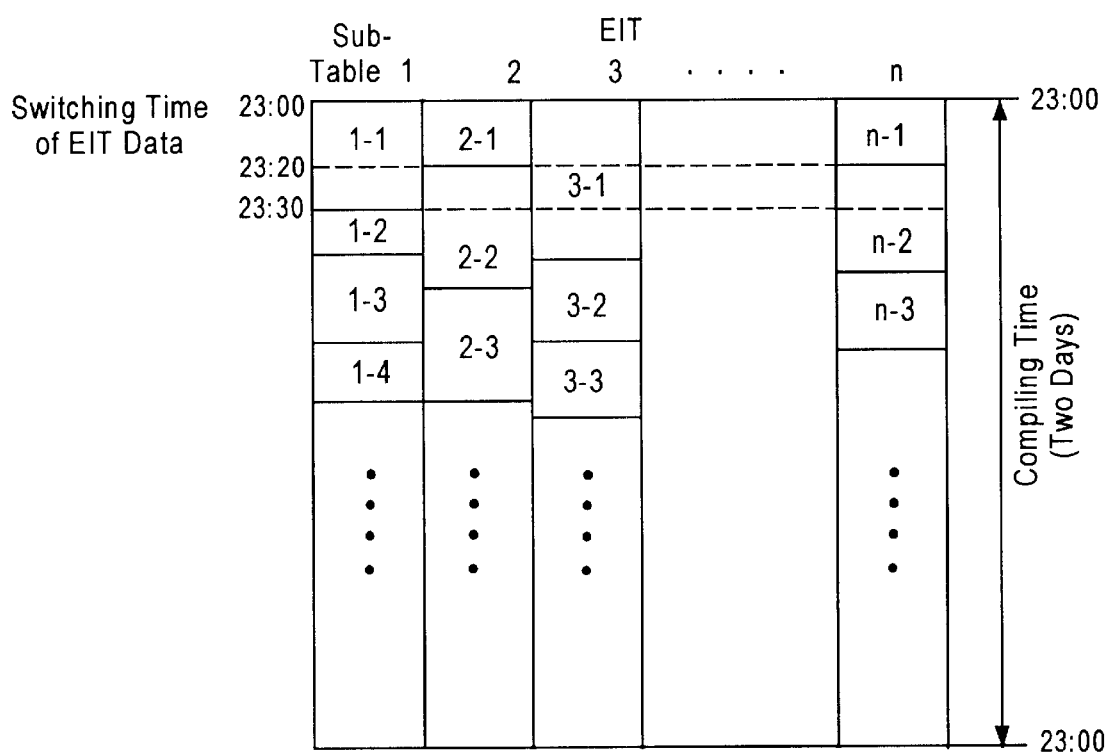
FIG. 14 is an illustration which shows version grouping for bandwidth adjustment.

FIG. 14 shows data elements of each sub-table of EIT (Event Information Table) and transmission schedules thereof. Typically, a table has a single sub-table or a plurality of sub-tables. The times to update the sub-tables do not usually agree with each other. For example, the data element 1-1 of the sub-table 1 is switched with the data element 1-2 at 23:30, while the data element 2-1 of the sub-table 2 is switched with the data element 2-2 at 23:20. Specifically, the time when data of the EIT is changed corresponds to the time when one of the data elements of any of the sub-tables is changed (i.e., 23:20, 23:30,...). This embodiment does not determine the transmission cycle every switching time interval (i.e., 23:00–23:20, 23:20–23:30,...), but in units of a minimum period of time t as determined in the following relation.

Minimum period of Time $t$ for Calculation of Transmission Cycle=Data Transmission period of Time (Compiling Time)/ Maximum Number of Transmission Cycle Schedules 35 where the data transmission period of time corresponds to, for example, 2-day broadcasting of EPG/SI tables prepared by the control data generator 21, and the maximum number of the transmission cycle schedules 35 is the maximum number of data elements to be stored in a memory of each of the control data outputting units 22a to 22c.

For example, when t=25 minutes, one of the data elements to be transmitted from 23:00 to 23:25 is selected as an object of determination of the transmission cycle. For example, in the sub-table 2, two data elements: the data elements 2-1 and 2-2 are transmitted from 23:00 to 23:25. Thus, one from them having a greater amount of data is selected. In this case, the data element 22 is greater in amount of data than the data element 2-1 and thus selected as an object of determination of the transmission cycle between 23:00 and 23:25. Specifically, the transmission cycle between 23:00 and 23:25 is determined assuming that the data element 2-2 is to be transmitted from 23:00 to 23:25.

It is advisable that the minimum period of time t be determined not to be a value less than a given lower limit for avoiding an excessive increase in number of times the transmission cycle is determined.

The output circuit 28 supplies bandwidth-determined transport packets in a unit of output from each of the control data outputting units 22a to 22c of the control data outputting circuit 22 to corresponding one of the control data outputting units 22a to 22c through the bus 23.

Each of the control data outputting units 22a to 22c receives tables through the input circuit 36 in the transport packet form and stores them in the storage device 37. The storage device 37 switches the tables already held therein with the new ones until the switching time set by the version generator 25. Subsequently, the output circuit 38 outputs the new tables to the multiplexer 4 at the switching time.

The tables which are already classified by the bandwidth adjuster 27 of the control data generator 21 into twelve groups 1 to 12, as shown in table 5 of FIG. 16, according to the transmission cycles are stored in the storage device 37. NIT (Network Information Table) and CAT (Conditional Access Table) are collected into one group since they are to be outputted at the same transmission cycle in light of properties of their data. SDT(A) and SDT(O) are usually to be outputted at a transmission cycle of 3 sec., but they may be required to be outputted at different transmission cycles and thus are separated into different groups. The same applies to other tables.

Figure 17:
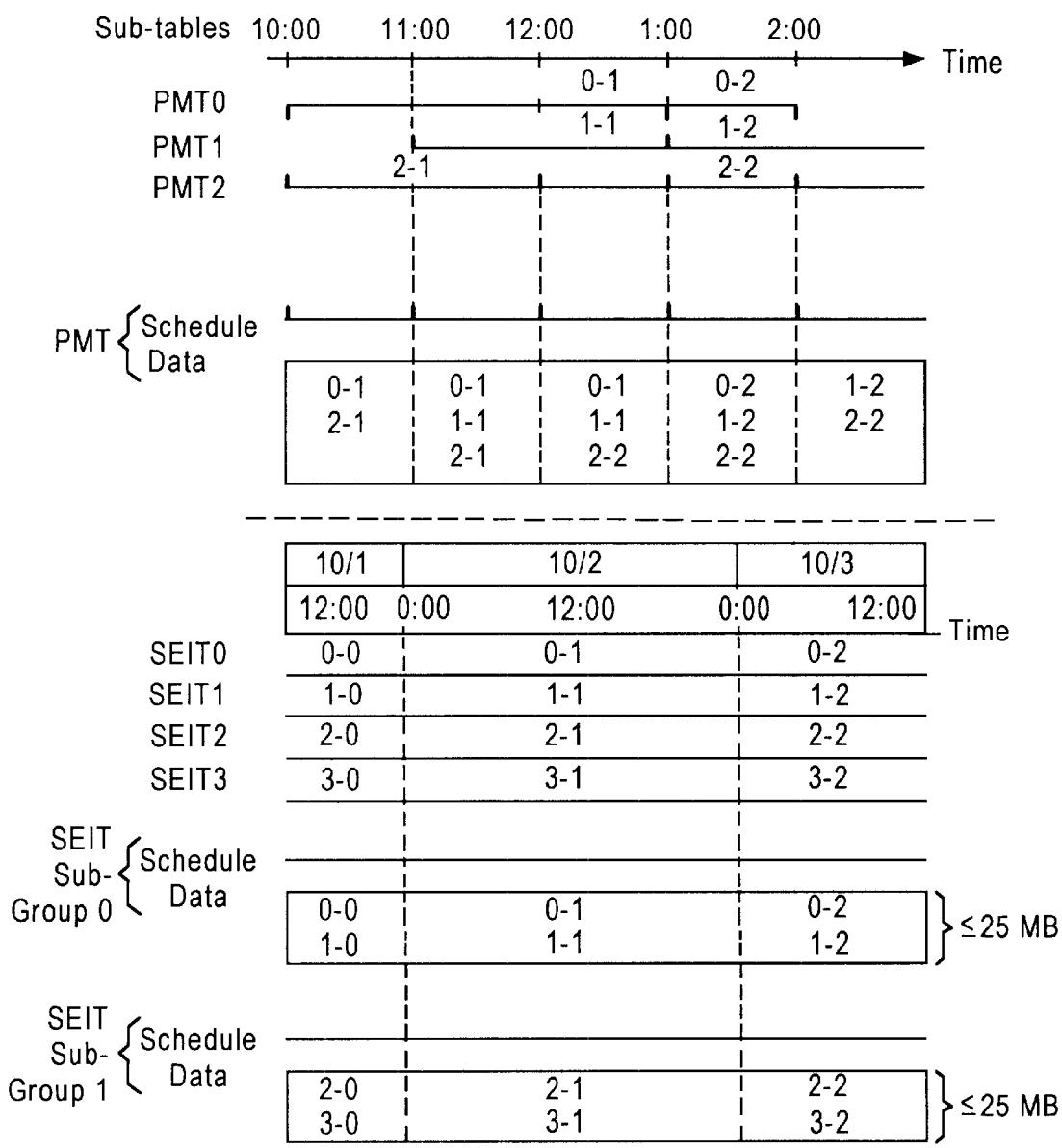
FIG. 17 is an illustration which shows table grouping in sub-tables.

The tables to be stored in the storage device 37 are further classified by the TS packetizing circuit 26 into groups, as shown in FIG. 17, in units of a sub-table according to information updating times. For example, PMT consists of sub-tables PMT0, PMT1, and PMT2. At 10:00, transmission of a data element 0-1 (i.e., a collection of sections having the same version number) of the sub-table PMT0 and a data element 2-1 of the sub-table PMT2 is initiated. At 11:00, transmission of a data element 1-1 of the sub-table PMT1 is initiated. Thus, the data elements 0-1 of the sub-table PMT0 and the data element 2-1 of the sub-table PMT2 which are to be transmitted from 10:00 to 11:00 are collected into a first group. The data elements 0-1, 1-1, and 2-1 of the sub-tables PMT0, PMT1, and PMT 2 which are to be transmitted from 11:00 to 12:00 are collected a second group.

When the amount of data of each table is greater than a preselected threshold value (e.g., 25 MB), sub-tables thereof are divided into sub-groups. For example, SEIT has a large amount of data and thus divided into sub-groups 0 and 1, as shown in the drawing.

Figure 18:
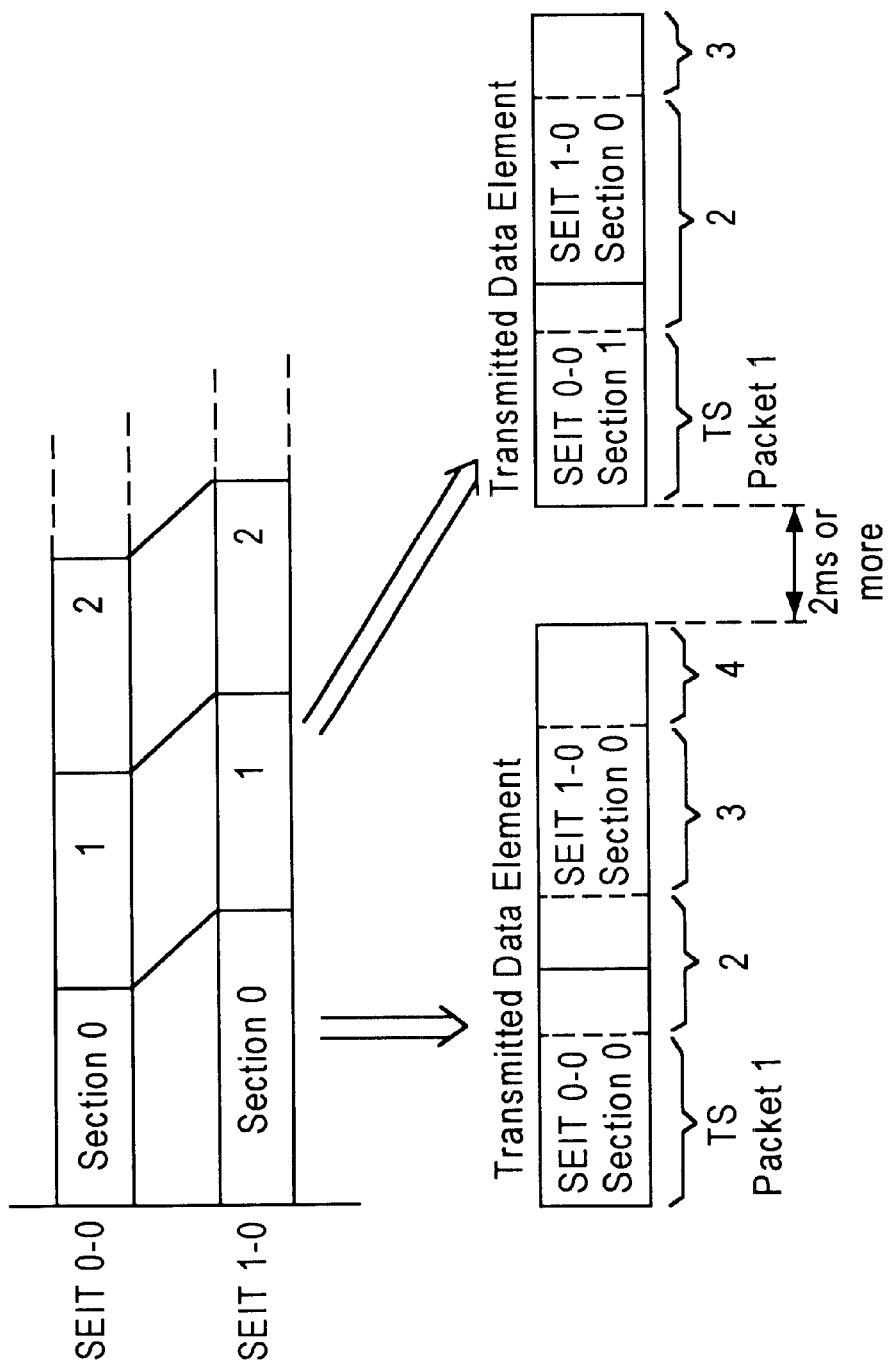
FIG. 18 is an illustration which shows table grouping in section numbers.

The sub-tables of each table to be stored in the storage device 37 are further classified by the TS packetizing circuit 26 into groups, as shown in FIG. 18, in units of a transmitted data element. The transmitted data element of each group consists of sections having the same section number and are divided into consecutive TS packets in the multi-section format. This results in greatly improved transmission efficiency as compared with when TS packets are formed in units of a section. The transmitted data elements are outputted from the output circuit 38 at intervals of 25 ms. (25/1000 sec.) or more under requirements in the MPES2 standard.

When a given switching time is reached, the data elements of each table to which a first version number is assigned are first transmitted. The scheduler 39 issues a command for the storage device 37 to output table data of each table group in cycles to a cue in the output circuit 38, as will be described below in detail. When a broadcasting time of the table data of each table group has expired, the table data is switched with subsequent one.

Figure 19:
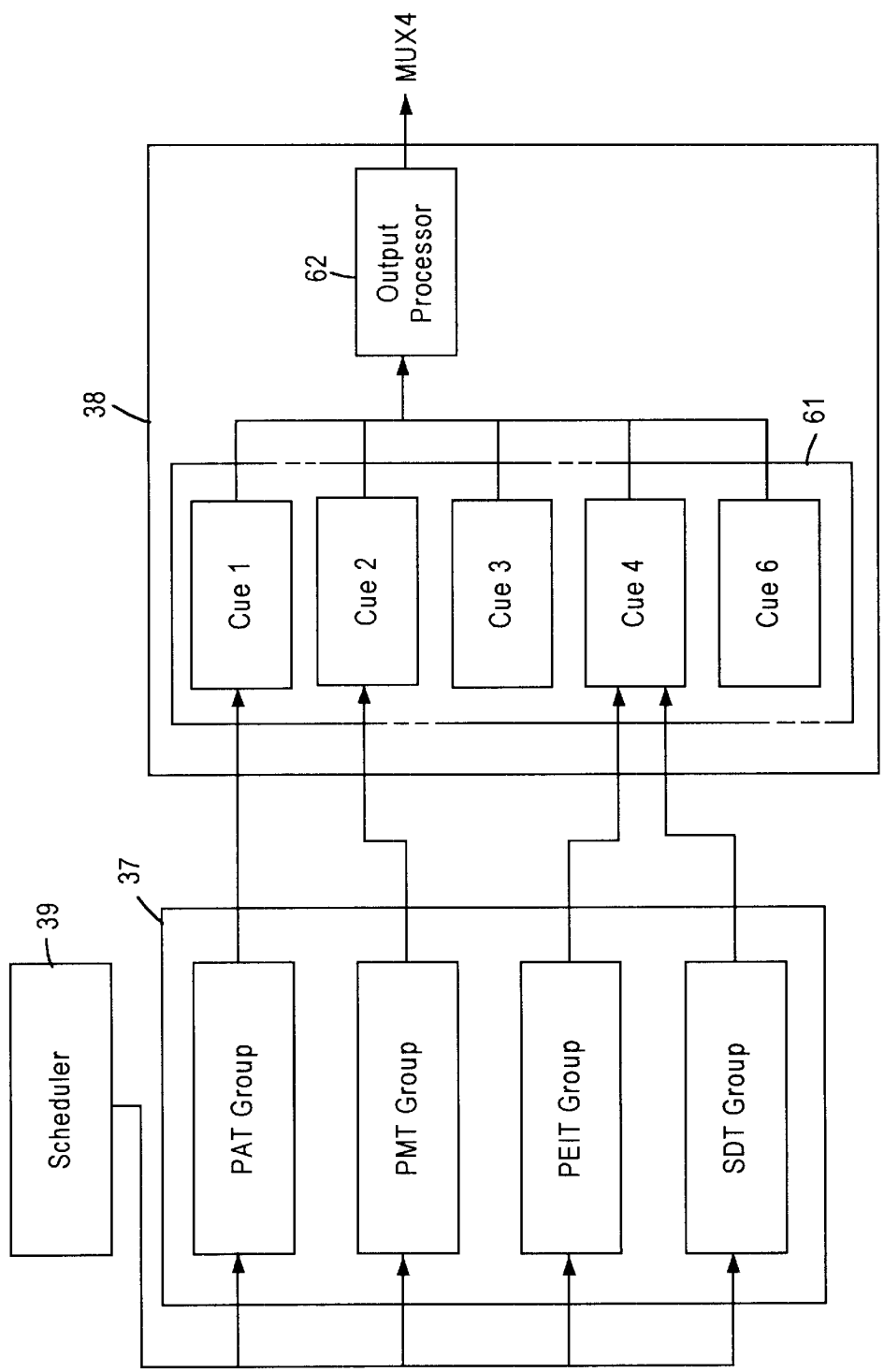
FIG. 19 is a block diagram which shows a circuit structure of an output circuit of a control data outputting circuit shown in FIG. 4.

The output circuit 38 includes, as shown in FIG. 19, an input cue 61 and an output processor 62 and is designed to output the table data to the multiplexer 4. The input cue 61 consists of six cues 1 to 6 having different degrees of priority, respectively. The table data is read preferentially out of one of the cues 1 to 6 having a higher degree of priority. For example, when the cues having the first to third priorities are empty, the table data in the cue having the fourth priority is read out with first priority.

The cues 1 to 6 are to store the table groups in FIG. 16 as listed below.

Cue 1: group 3 (PAT)
Cue 2: group 2 (PMT)
Cue 3: group 1 (CAT, NIT)
Cue 4: groups 5, 6, 9, and 10 (SDT(A), SDT(O), PEIT(A), and PEIT(O))
Cue 5: group 4 (XLT)
Cue 6: groups 11, 7, 8, and 12 (SEIT, other tables)

As an example, the group 1 will be discussed below with reference to FIG. 20.

The group 1 has a plurality of sub-table data elements each of which corresponds to one of the data groups, as described above with reference to FIG. 17, defined in units of the sub-table. For the scheduler 39 issues a command for the storage device 37 to output the sub-table data element whose data element number is 455 to the cue 1 at intervals of 0.5 sec. from 10:00 AM to 15:00 PM. After 15:00 PM, the scheduler 39 issues a command for the storage device 37 to stop outputting the sub-table data element 455 and to start to output a subsequent sub-table data element 456 at intervals of 0.6 sec. Each of the sub-table data elements consists of a plurality of the transmitted data elements, as shown in FIG. 18, which are supplied to corresponding one of the cues 1 to 6 at intervals of 25 ms or more.

Figure 21:
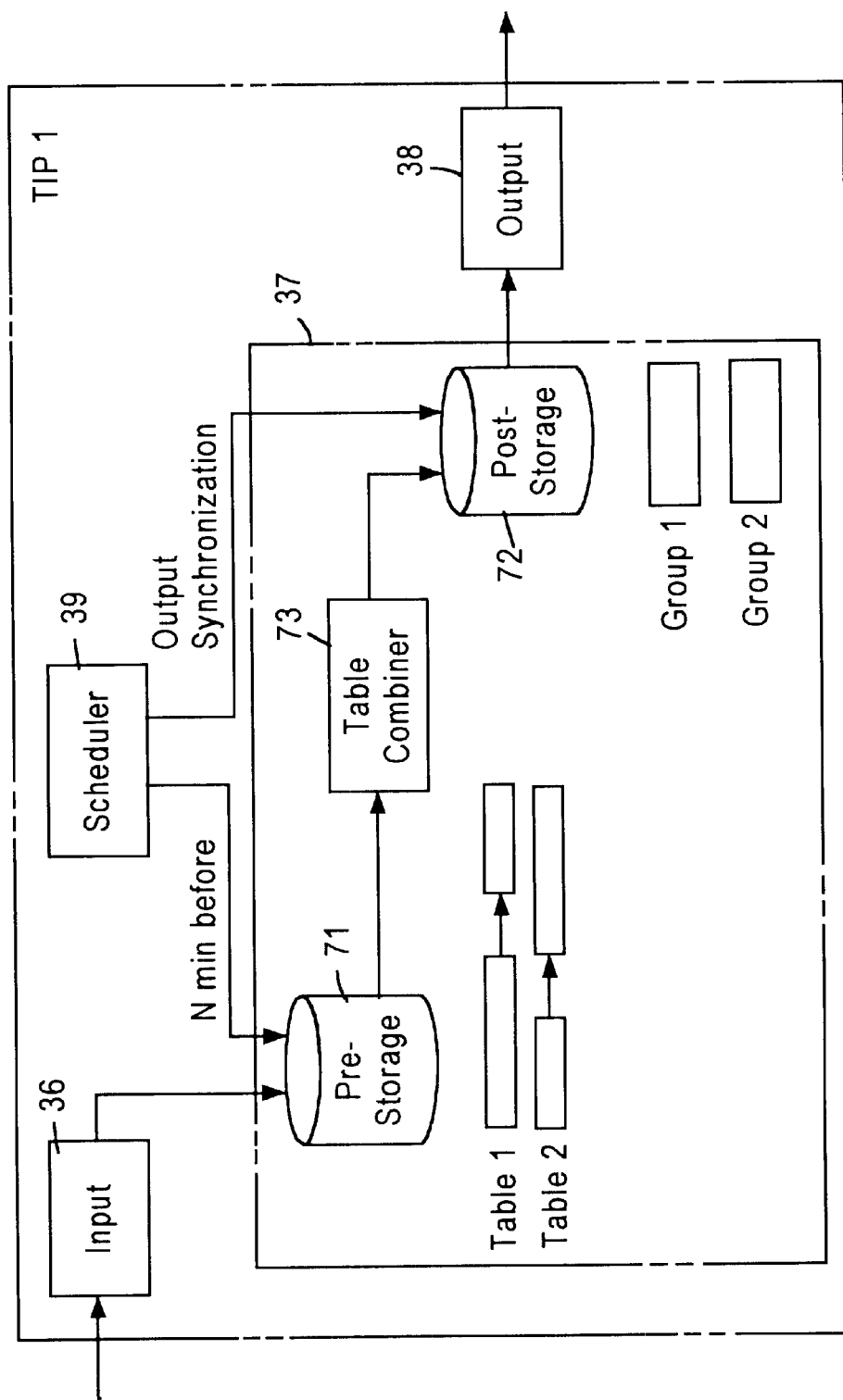
FIG. 21 is a block diagram which shows a modified form of a storage device 37 for saving a capacity thereof.

In the case where a storage region or capacity of the storage device 37 of each of the control data outputting units 22a to 22c of the control data outputting circuit 22 is not great enough to hold all input data, the capacity of the storage device 37 needs to be saved. FIG. 21 shows a modified structure of the storage device 37 for saving the capacity thereof.

The storage device 37 includes a pre-storage section 71, a table combining section 73, and a post-storage section 72. The scheduler 39 connects with both the pre-storage section 71 and the post-storage section 72 for timing data input and data output. The table data (i.e., table 1, table 2, . . . ) which is supplied from the TS packetizing circuit 26 shown in FIG. 5 directly to the output circuit 28 through a line 500 without being packetized is inputted to the input circuit 36 and stored in the pre-storage section 71 temporarily. The tables are supplied from the pre-storage section 71 to the table combining section 73 N minutes (e.g., 10 minutes) before all the tables are outputted from the output circuit 38 and combined into groups (group 1, group 2 . . . ) which are, in turn, stored in the post-storage section 72.

SEITs whose updating times are the same may alternatively be grouped before they are inputted to the storage device 37, while PMTs and PEITs whose updating times are different may be grouped, as described above, N minutes before the table data is outputted. This results in more efficient use of a CPU and memories.

Figure 22:
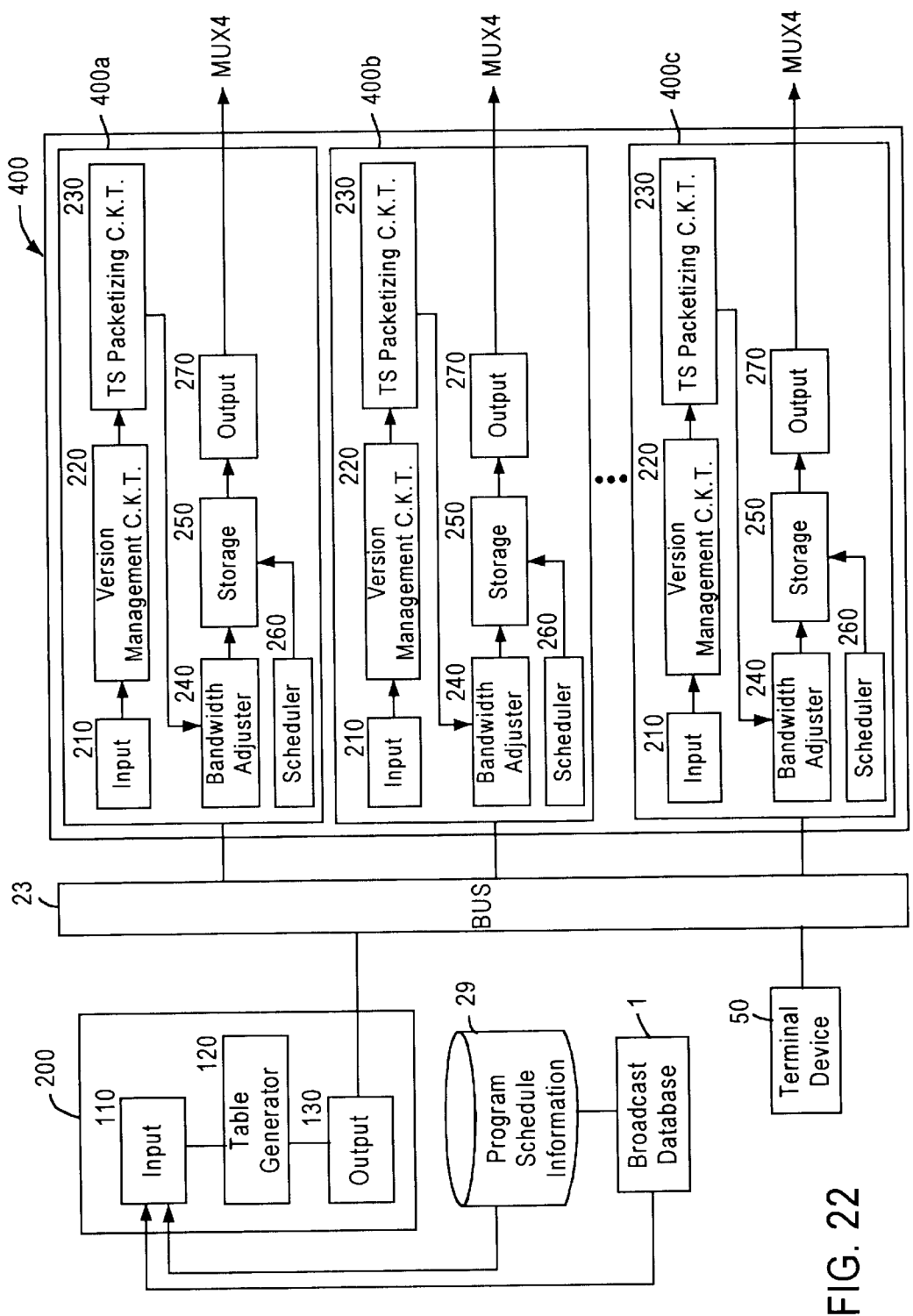
FIG. 22 is a block diagram which shows a control information generator according to the second embodiment of the invention.

FIG. 22 shows a control information generator 20 according to the second embodiment of the invention.

The control information generator 20 includes a control information generating circuit 200 and a control information outputting circuit 400 connecting with the control information generating circuit 200 through a bus 23. The control information generating circuit 200 is designed to receive program schedule information 29 from the broadcast database 1 to produce table information and includes an input circuit 110, a table generator 120, and an output circuit 130. The input circuit 110 receives the program schedule information 29. The table generator 120 produces the table information which is to be managed in a version number. The output circuit 130 outputs the table information to the control information outputting circuit 400 through the bus 23.

The control information outputting circuit 400 consists of a plurality of control information outputting units (only three 400a, 400b, and 400c are shown for the brevity of illustration). Each of the control information outputting units 400a to 400c includes an input circuit 210, a version management circuit 220, a TS packetizing circuit 230, a bandwidth adjuster 240, a storage device 250, a scheduler 260, and an output circuit 270. The input circuit 210 receives the table information from the control information generating circuit 200 through the bus 23. The version management circuit 220 assigns a version number to the table information inputted from the input circuit 210. The TS packetizing circuit 230 translates the table information into a data structure (i.e., transport stream packets) required for database transmission. The bandwidth adjuster 240 determines a bandwidth and a transmission cycle of the table information. The storage device 250 stores therein the table information. The scheduler 260 controls timing with which the table information stored in the storage device 250 is supplied to the output circuit 270.

The terminal device 50 is connected to the control information outputting circuit 400 through the bus 23. The terminal device 50 is designed to input a manually adjustable control parameter such as a bandwidth adjustment range to the control information outputting circuit 400.

Figure 23:
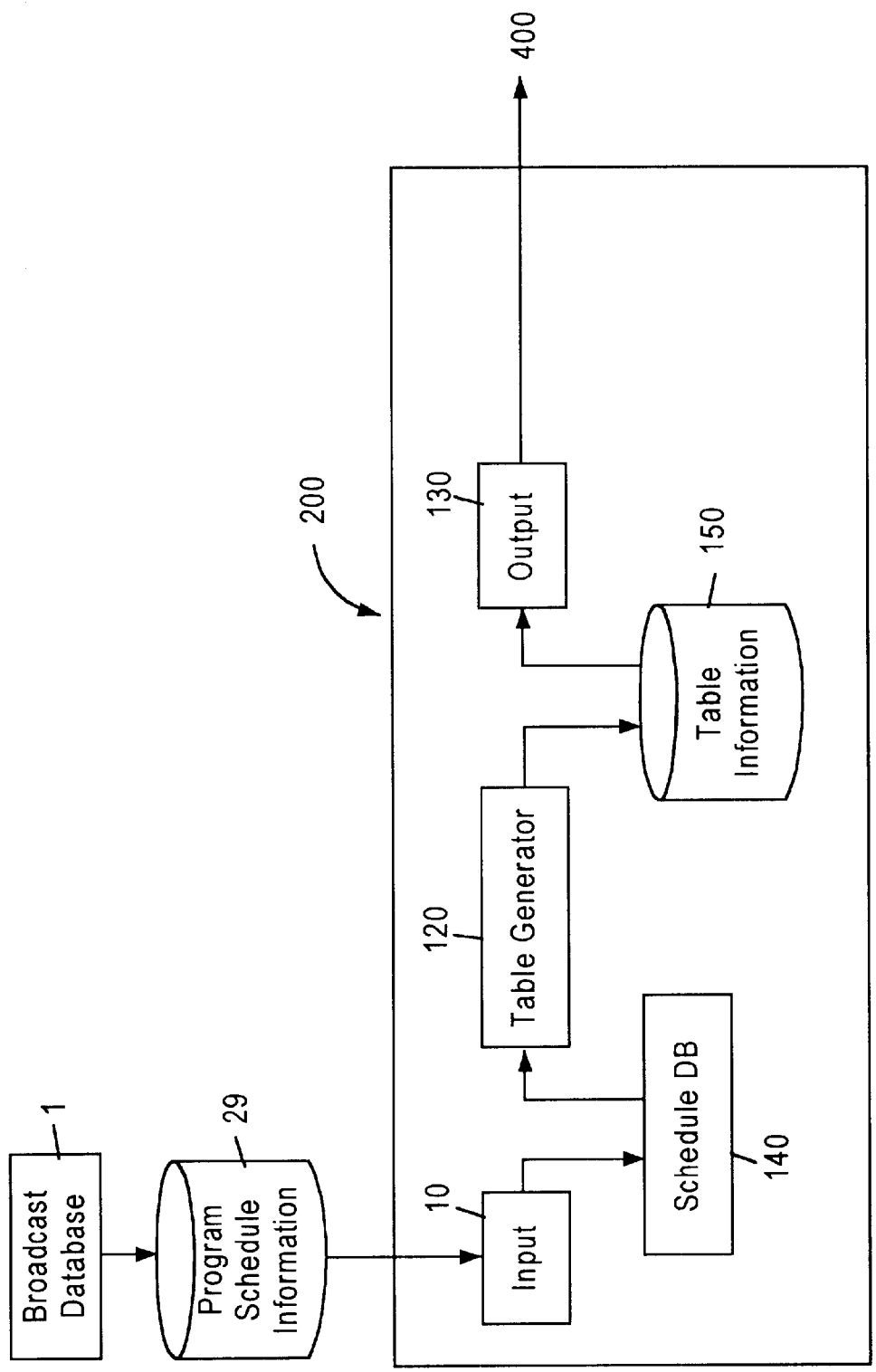
FIG. 23 is a block diagram which shows a control information generating circuit.

The input circuit 110 of the control information generating circuit 200, as shown in FIG. 23, receives the program schedule information 29 from the broadcast database 1 and stores it in a schedule data base 140. The table generator 120 produces table information 150 and outputs it to the control information outputting circuit 400 through the output circuit 130.

Figure 24:
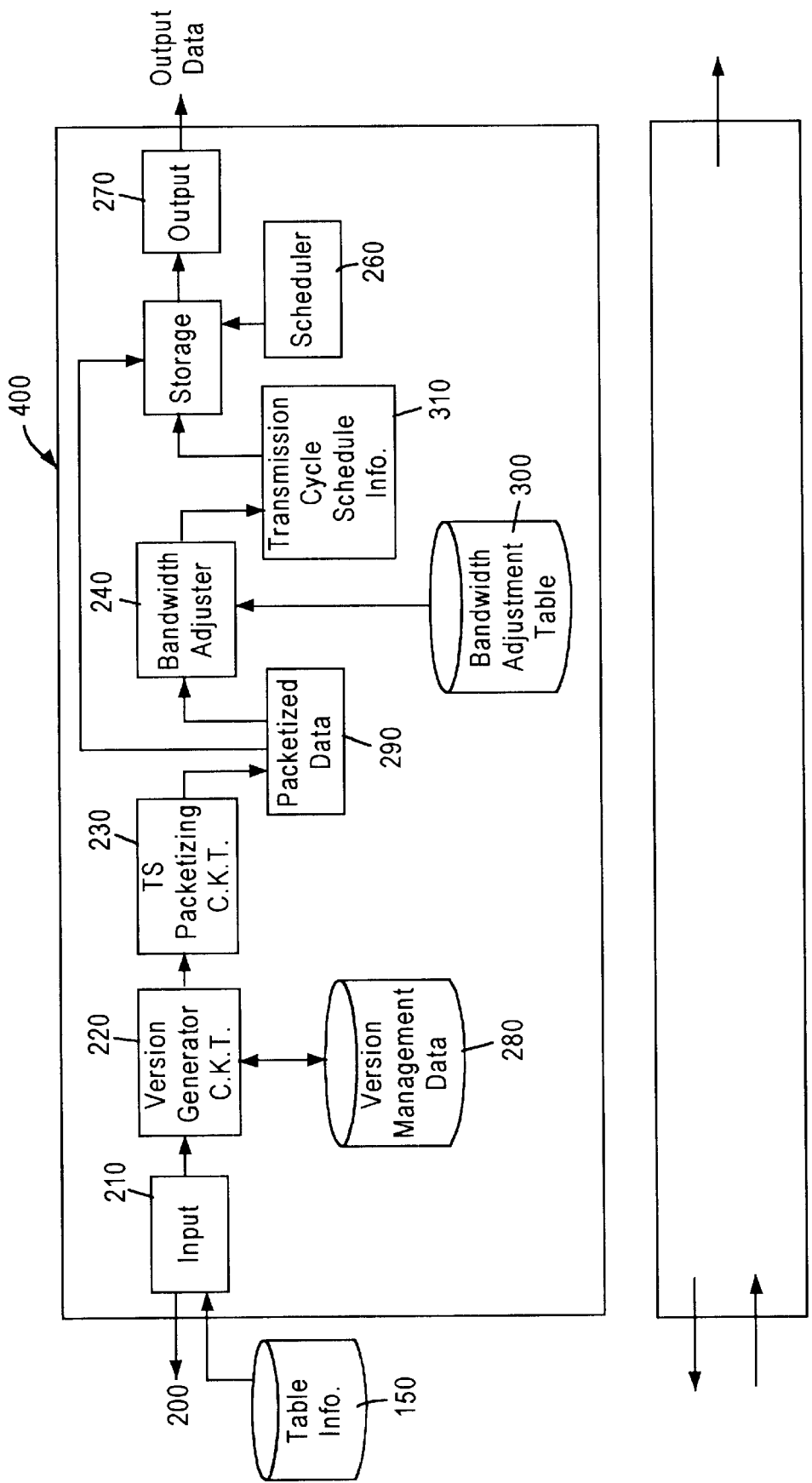
FIG. 24 is a block diagram which shows a control information outputting circuit.
Figure 25:
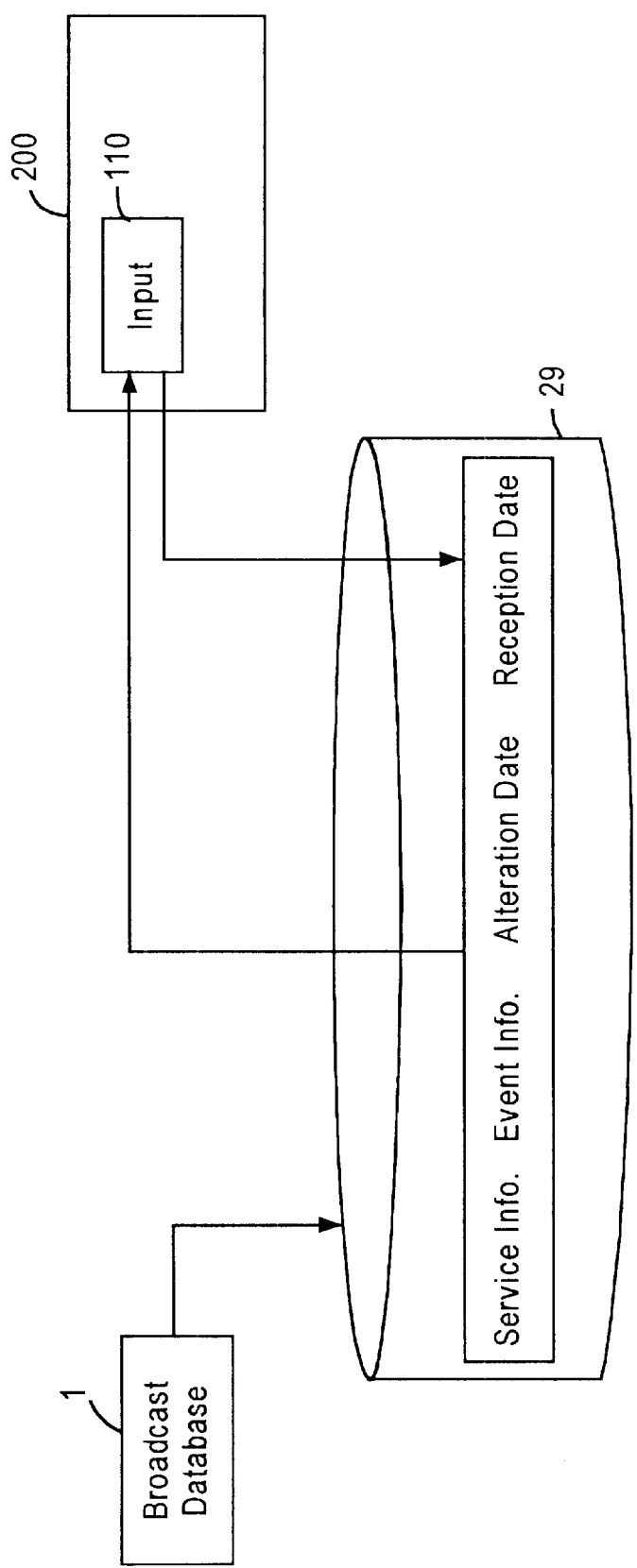
FIG. 25 is an illustration which shows an alternation history written in program schedule information.

The table information 150 from the control information generating circuit 200 is, as shown in FIG. 24, inputted to the version management circuit 220 through the input circuit 210 of one of the control information outputting units 400a to 400c. The version management circuit 220 prepares version management data 280. The TS packetizing circuit 230 produces packet data 290 whose bandwidth is determined in the bandwidth adjuster 240 by look-up using a bandwidth adjustment table 300. The bandwidth-determined packet data is stored in the storage device 250 as transmission cycle schedule information 310 which is, in turn, outputted through the output circuit 270 in response to a command from the scheduler 260.

In operation, upon input of new program schedule information from the broadcast database 1, the input circuit 210 fetches the program schedule information 29 from the broadcast database 1 and finds newly changed information to produce the schedule database 140. The table generator 120 prepares the table information 150 based on the schedule database 140. For example, when a program name of a program (i.e., an event) A is altered, the table generator 120 prepares EIT (Event Information Table).

The table generator 120 prepares PSI (Program Specific Information)/SI (Service Information) tables that are audio/video data stream addressing information-service and program information tables. Upon completion of preparation of the above tables (i.e., the table information 150), the output circuit 130 informs the control information outputting circuit 400 that the new control data has been prepared.

The input circuit 210 of each of the control information outputting units 400a to 400c of the control information outputting circuit 400 requests that the output circuit 130 of the control information generating circuit 200 supply the control data of an amount corresponding to a memory capacity of the input circuit 210. The output circuit 130 sends to each of the control information outputting circuits 400a to 400c the control data written in set files by an amount as requested by the input circuit 210.

When each of the control information outputting units 400a to 400c receives the new control data, the version controller 22 assigns a version number that is a version number of the control data outputted currently plus one (1) to the new control data in accordance with the MPEG2 standards. The TS packetizing circuit 230 packetizes the version number-assigned control data inputted from the version management circuit 220 and supplies it to the bandwidth adjuster 240. The bandwidth adjuster 240 calculates the transmission cycle of the input control data so that it can be transmitted within a preselected bandwidth written in the set files and produces and stores the transmission cycle schedule information 310. Upon completion of a sequence of such operations, the scheduler 260 informs the output circuit 130 of the control information generating circuit 200 of the ready for control data transmission.

When all the control information outputting units 400a to 400c have finished preparing the transmission cycle-determined PSI/SI tables, the output circuit 130 informs each scheduler 260 that they are ready to be outputted. The scheduler 260 activates an internal timer and has the storage device 250 output the table data packets cyclically according to a specified schedule (i.e., in the determined transmission cycle) to the output circuit 270. The output circuit 270 supplies the input to the multiplexer 4.

The operations of the control information generator 20 will also be discussed below with reference to FIGS. 25 to 29.

The program schedule information 29 prepared by the broadcast database 1 has areas for writing therein an alternation history or date on which the program schedule information 29 was altered and a reception history or date on which the control information generating circuit 200 received the program schedule information 29. The reception date is written when the control information generating circuit 200 accesses the program schedule information 29 and reads the alternation date. This allows the control information generator 20 to know a newly altered portion of the program schedule information in detail. Specifically, the control information generator 20 can specify only tables whose version numbers need to be changed. This reduces a load of a receiver.

Figure 26:
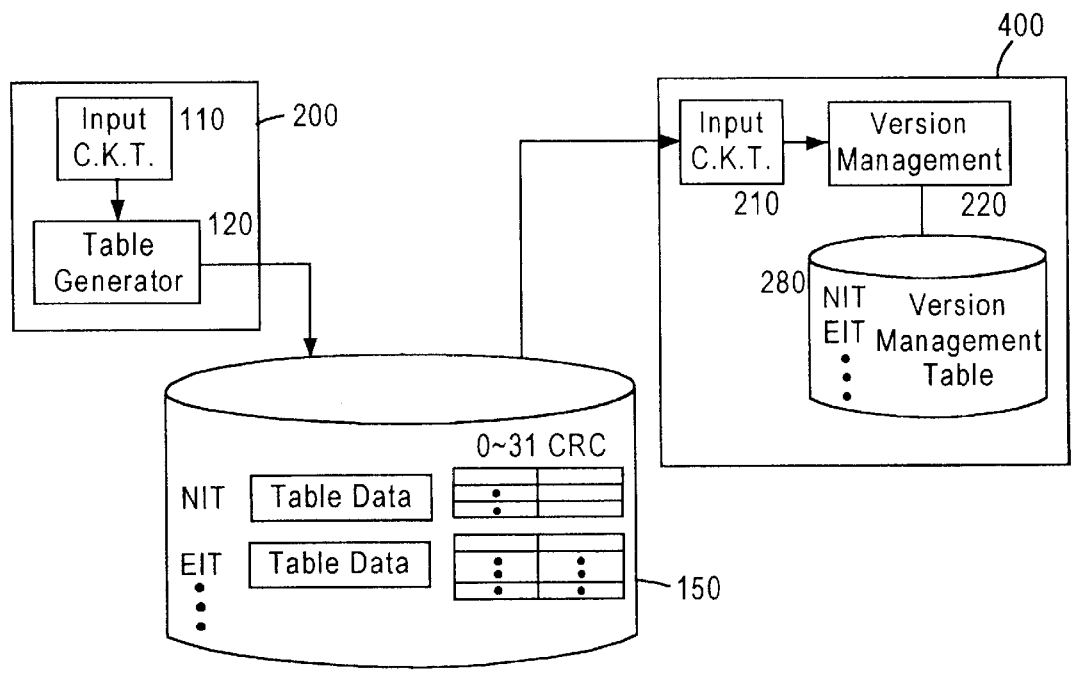
FIG. 26 is an illustration which shows the relation between CRCs (Cyclic Redundancy Checks) and version numbers.

FIG. 26 shows the relation between CRCs (Cyclic Redundancy Checks) and version numbers.

The table generator 120 of the control information generating circuit 200 serves the function of preparing a ver. No.-vs.-CRC table listing the relation between version numbers 0 to 31 and CRCs in a table produced by the table generator 120. By look-up using the ver. No.-vs.-CRC table, the version management circuit 220 obtains information (CRC) in a table corresponding to a current version number to be assigned to output data. Specifically, the version management circuit 220 assigns a version number that is the latest version number plus one (1) to the control information newly produced by the control information generating circuit 200 and looks up the ver. No.-vs.-CRC table to find a CRC corresponding to the assigned version number and adds the CRC to a section of a sub-table of the table information outputted to the TS packetizing circuit 230. This minimizes the possibility of a skip of the version numbers. The version number is incremented by one (+1) upon change in contents of a table in accordance with the MPEG2 standards. The CRC is an error detection code added to each section which is one unit of a table according to the MPEG2 standards. The CRC changes when at least part of each section, for example, a version number changes. This eliminates the need for calculation of the CRC in the control information outputting circuit 400.

Figure 27:
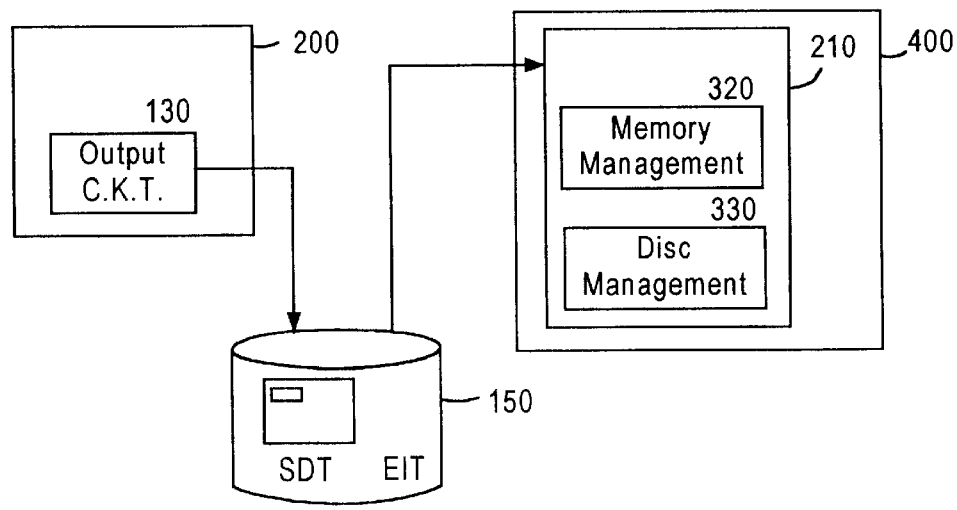
FIG. 27 is a block diagram which shows a circuit structure of an output circuit of a control information outputting circuit.

The input circuit 210 includes, as shown in FIG. 27, a memory management circuit 320 which monitors an available memory capacity of the control information outputting circuit 400 and informs the control information generating circuit 200 of the available memory capacity. The control information generating circuit 200 sends to the control information outputting circuit 400 the table information 150 of an amount within the available memory capacity of the control information outputting circuit 400. The input circuit 210 may also includes a disc management circuit 330 which manages part or all of the table information 150 on a hard disc.

The control information generating circuit 200 may partially compile the control information (i.e., only an altered portion of the table information 150). In this case, the control information outputting circuit 400 can read the table information 150 from a leading portion thereof according to the same procedures as when the control information is compiled fully. This reduces an operation load of the control information outputting circuit 400, resulting in an increase in operation speed thereof.

Figure 28:
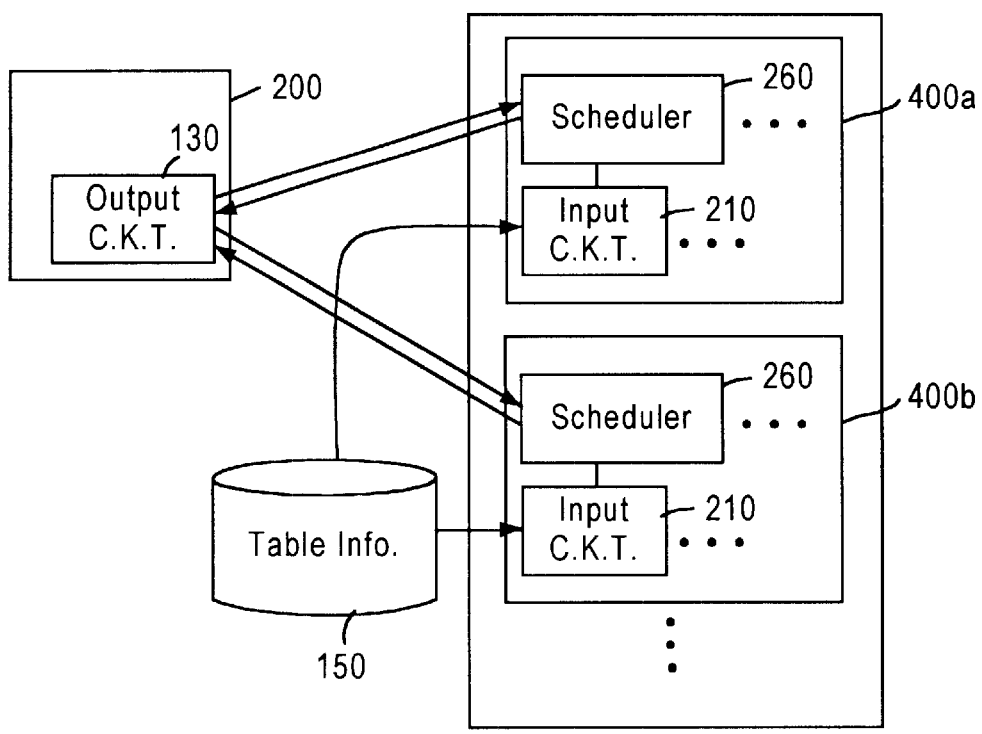
FIG. 28 is a block diagram which shows the operational relation between an output circuit of a control information generating circuit and control information outputting units.
Figure 29:
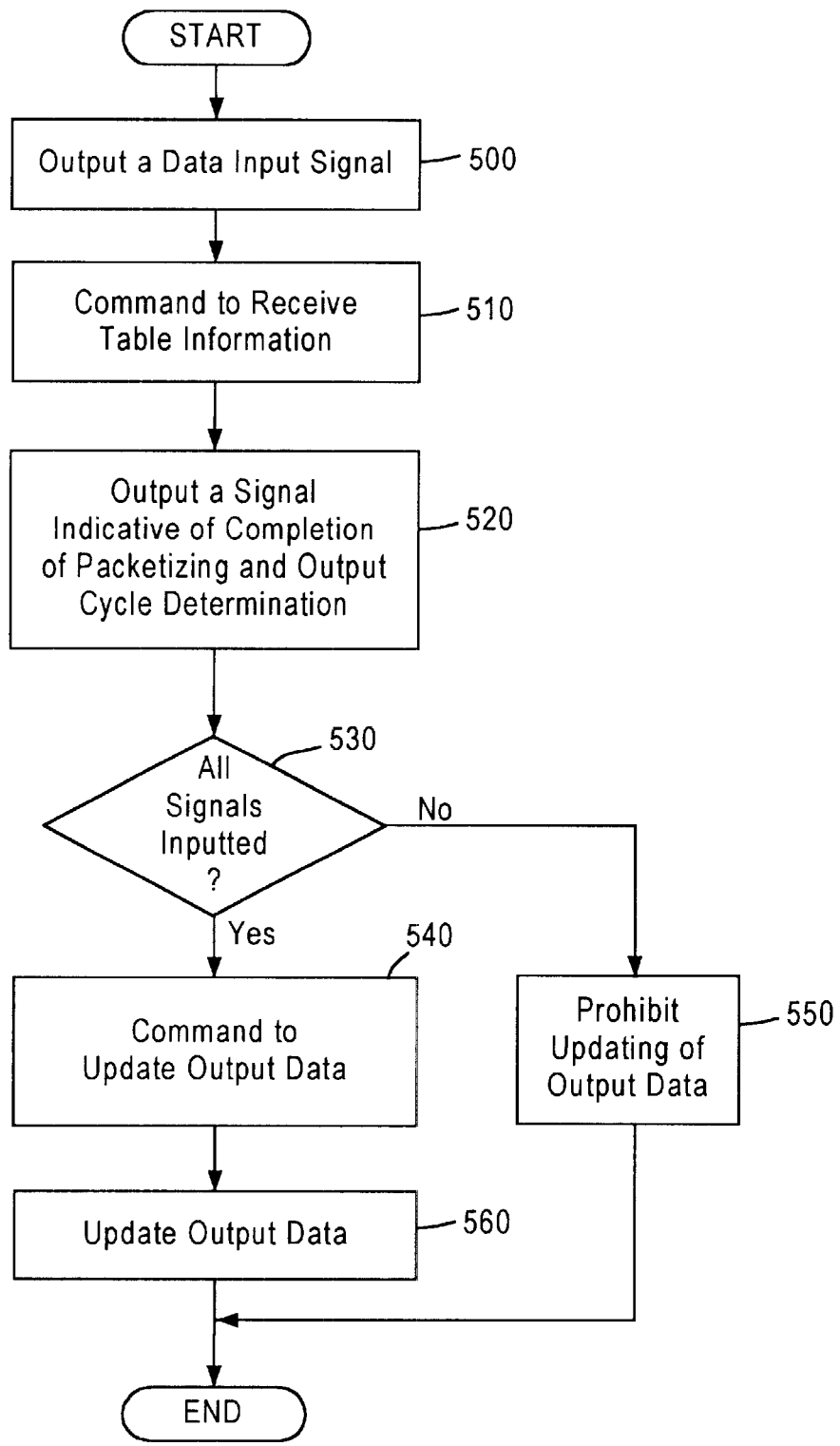
FIG. 29 is a flowchart of a program performed by the output circuit of the control information generating circuit in FIG. 28.

FIG. 28 shows the output circuit 130 of the control information generating circuit 200 which controls the preparation of the control information to be outputted from each of the control information outputting units 400a to 400c, which is shown in a flowchart of FIG. 29.

After entering the program, the routine proceeds to step 500 wherein the output circuit 130 of the control information generating circuit 200 issues a command for the scheduler 260 of each of the information control outputting units 400a to 400c to output a data input signal. The routine proceeds to step 510 wherein the scheduler 260 outputs the data input signal to the input circuit 210 to receive the table information. The routine proceeds to step 520 wherein after the table information inputted to the input circuit 210 is packetized and determined in transmission cycle, the scheduler 260 provides a signal indicative thereof to the output circuit 130 of the control information generating circuit 200. The routine proceeds to step 530 wherein it is determined whether the output circuit 130 has received the signals indicating that the table information has been packetized and determined in transmission cycle from all the control information outputting units 400a to 400b or not. If a YES answer is obtained, then the routine proceeds to step 540 wherein the output circuit 130 of the control information generating circuit 200 outputs updating signals to the schedulers 260 of all the control information outputting units 400a to 400c. The routine proceeds to step 560 wherein all the control information outputting units 400a to 400c update output data thereof simultaneously. If a NO answer is obtained in step 530 caused by, for example, a failure in communication between the control information generating circuit 200 and any of the control information outputting units 400a to 400c, then the routine proceeds to step 550 wherein the output circuit 130 provides updating disable signals to the schedulers 260 of all the control information outputting units 400a to 400c.

While in the above embodiment, the output circuit 130 is built in the control information generating circuit 200, it may be provided independently as functioning as a control information transferring circuit which manages only data transfer from the control information generating circuit 200 to the control information outputting circuit 400. This allows the control information generating circuit 200 to prepare and hold data in advance for future use.

Figure 30:
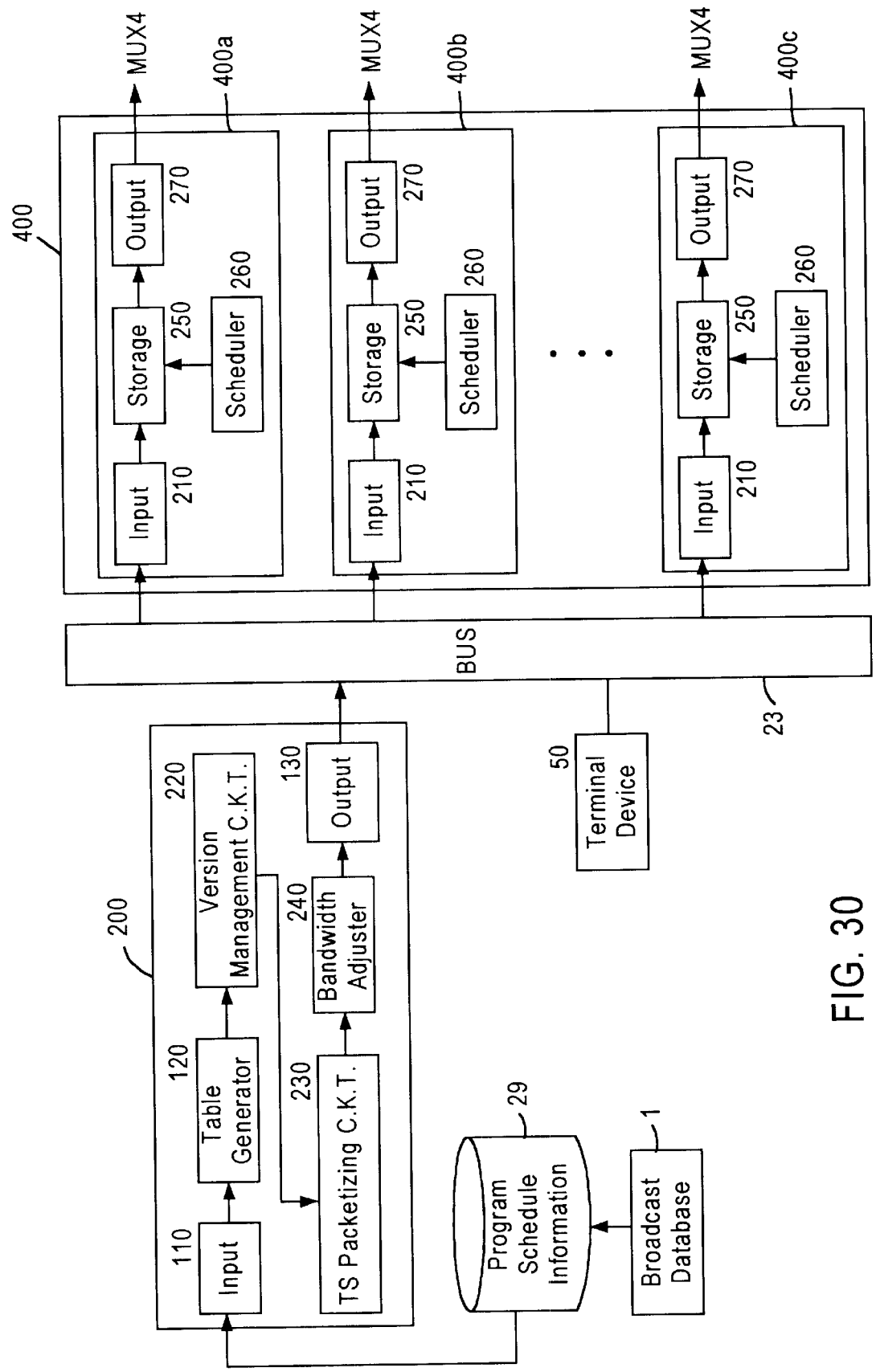
FIG. 30 is a block diagram which shows a control information generator according to the third embodiment of the invention.

FIG. 30 shows a control information generator 20 according to the third embodiment of the invention which is used in a broadcast system capable of performing a rotation compiling operation.

The control information generating circuit 200 includes the input circuit 110, the table generator 120, the version management circuit 220, the TS packetizing circuit 230, the bandwidth adjuster 240, and the output circuit 130. Each of the control information outputting units 400a to 400c of the control information outputting circuit 400 includes the input circuit 210, the storage device 250, the scheduler 260, and the output circuit 270. The same reference numbers as employed in FIG. 22 refer to the same parts, and explanation thereof in detail will be omitted here.

Figure 31:
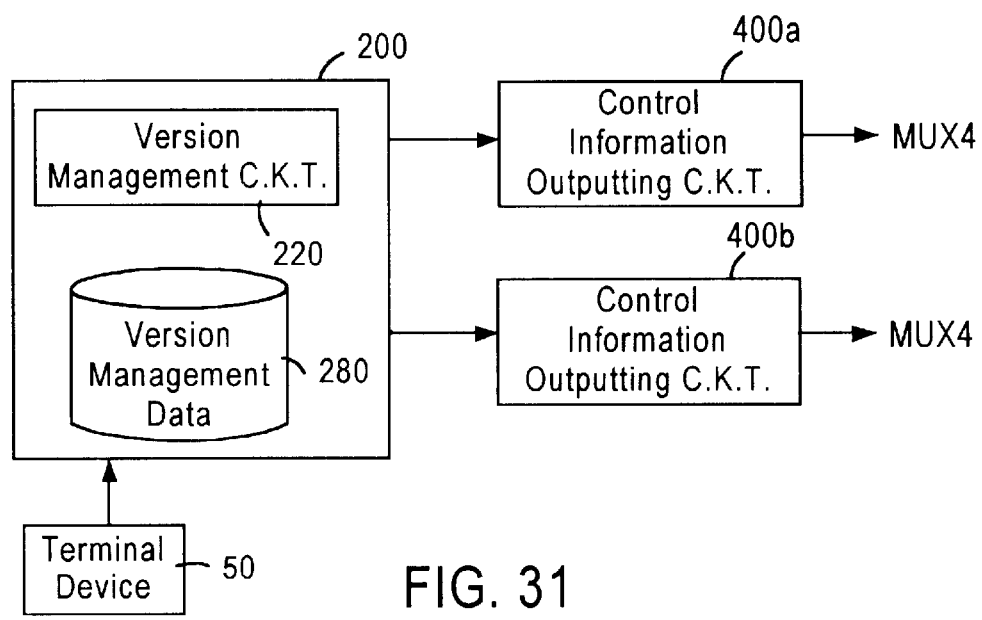
FIG. 31 is a block diagram which shows a version management circuit of a control information generating circuit of FIG. 30.

The control information generating circuit 200 includes, as shown in FIG. 31, the version management data 280 which stores version numbers prepared by the version management circuit 220 at all times.

Figure 32:
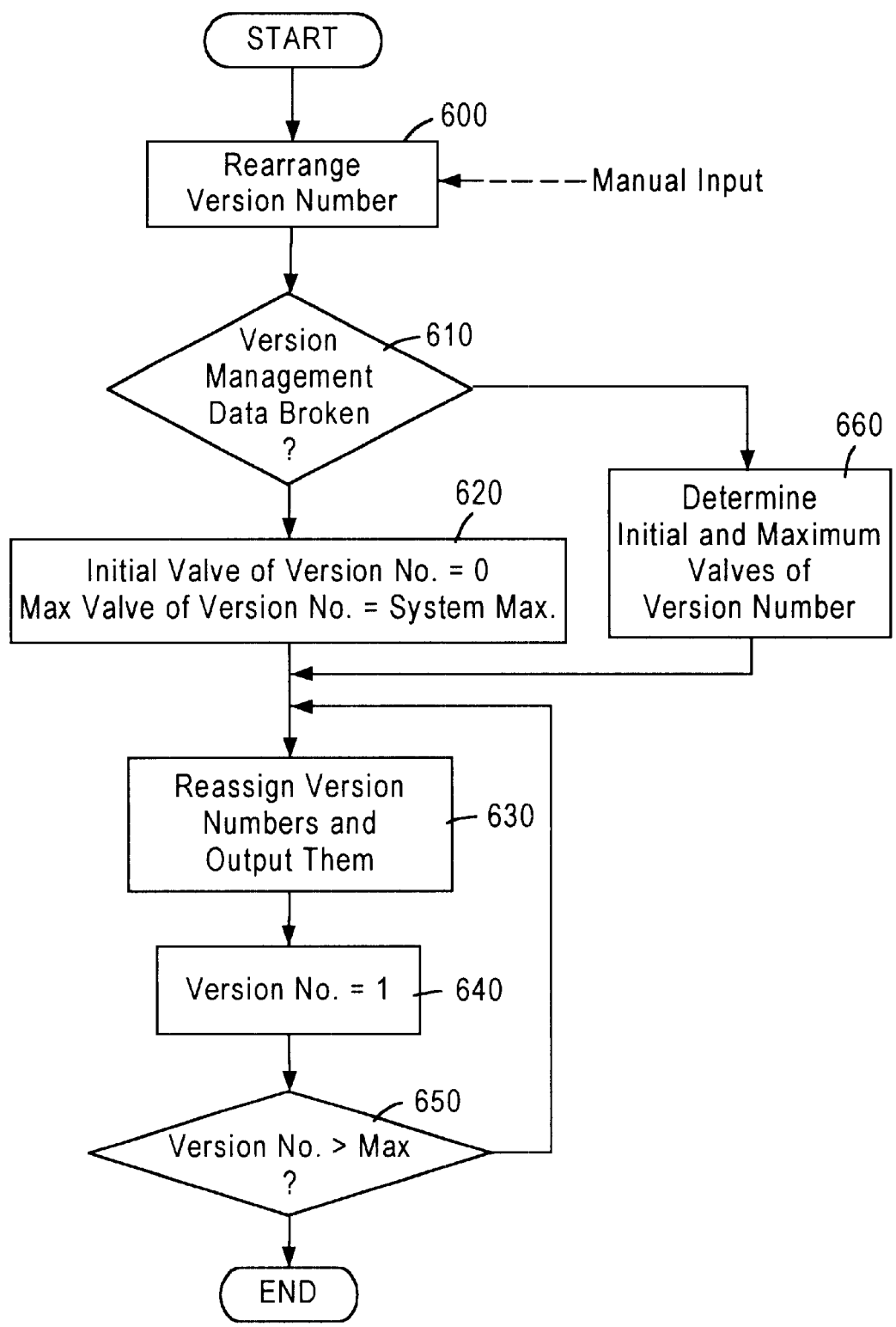
FIG. 32 is a flowchart of a version number-assigning program performed by the version management circuit in FIG. 31.

FIG. 32 shows a flowchart of a program to perform the rotation compiling operation in the third embodiment.

The version number that is a number for table version management is incremented by one (1) each time the table information is altered. All the version numbers are zero (0) through thirty one (31). After 31, it returns to 0. An IRD (Integrated Receiver and Decoder) is usually designed to receive only table information to which a version number immediately following a version number which has been received currently is assigned. Thus, if there is a skip in consecutive version numbers, it will cause the IRD to fail to receive subsequent table data.

Each time the program schedule information 29 is updated, the table generator 120 prepares a new table and increments the version number by +1. This version number is stored in the version management data 28. If a version skip is detected for some reason, an operator issues a command for the version management circuit 220 to recover or rearrange the version numbers through the terminal device 50 (step 600 in FIG. 32).

The version management data 280 is looked up to determine the greater of a version number assigned to a table that was last successful in being outputted from the control information generating circuit 200 and the current version number as a final value and the smaller thereof as an initial value. The version numbers between the initial value and the final value are reassigned in sequence to the same table which is, in turn, outputted to the control information outputting circuit 400 (step 660). For example, if the version number skips from 1 to 3, version numbers 1, 2, and 3 are reassigned in sequence to the same table which is, in turn, outputted to the control information outputting circuit 400. This allows the rotation compiling operation to be performed in the shortest processing time if one preceding an omitted version number can be known through the version management data 280.

If the version management data 280 is broken (YES in step 610) meaning that it is impossible to find a version number to be assigned to a table, then the version management circuit 220 outputs the same table repeatedly to the control information outputting circuit 400 while reassigning consecutive version numbers to it, in sequence, from the first one. Specifically, if it is difficult to know a version number of a table being outputted currently, then the version management circuit 220 sets the initial version number to zero (0) and the final version number to a maximum value (i.e., 31) in the system and assigns consecutive version numbers between zero and the maximum value, in sequence, to a subsequent table (steps 630, 640, and 650) and outputs it, in sequence, to the multiplexer 4 through the control information outputting circuit 400, thereby achieving version number matching.

Figure 13:
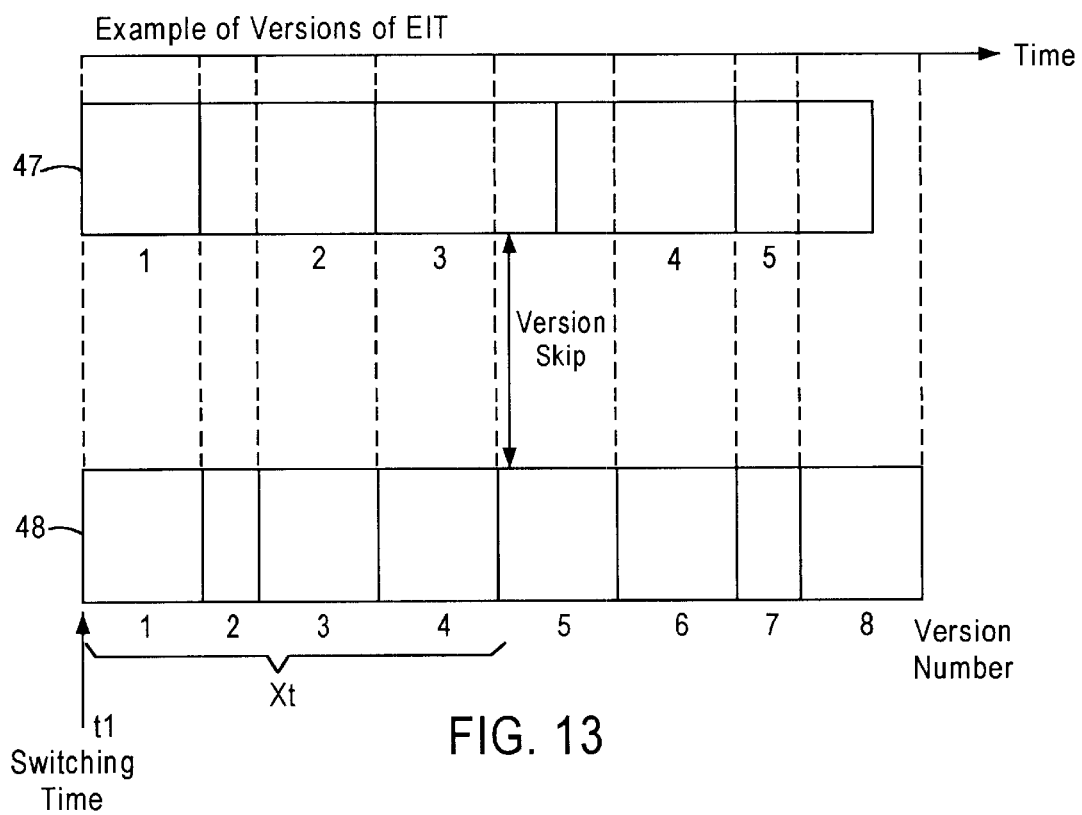
FIG. 13 is an illustration which shows a version skip detected by a version check circuit in FIG. 12.

Even if new control information cannot be prepared until time t1 in FIG. 13 for some reason, it can be transmitted in the control information outputting circuit 400 within a period of time during which no version skip occurs. For example, in FIG. 13, when the version number of the new data is changed to five (5) from four (4), the version number difference between the current data and the new data will be two, meaning that the version skip will occur. Thus, the time the version number of the new data changes to 5 may be considered as a time limit Xt the current data can be switched to the new data without the version skip. The version management circuit 220 calculates the time limits Xt for respective new tables and determines the earliest one as a data switching time at which the current data is to be switched to the new data (i.e., all the new tables) and provides a signal indicative thereof to the control information outputting circuit 400. Each of the control information outputting units 400*a* to 400*c* checks the storage device 250 for reception of all required data within the time limit Xt. If all the required data has not been stored in the storage device 250 within the time limit Xt, then it is determined that the version skip will occur.

The version management circuit 220 may alternatively provide a signal indicative of the time limit Xt of each table to the input circuit 210 to determine whether the version skip will occur or not every table.

The output circuit 130 of the control information generating circuit 200 may alternatively determine whether the version skip will occur or not by monitoring whether all the required data has been transferred to the control information outputting circuit 400 before the time limit Xt.

If the version skip is detected in either of the above manners, the rotation compiling operation is performed for achieving the version number matching.

Figure 33:
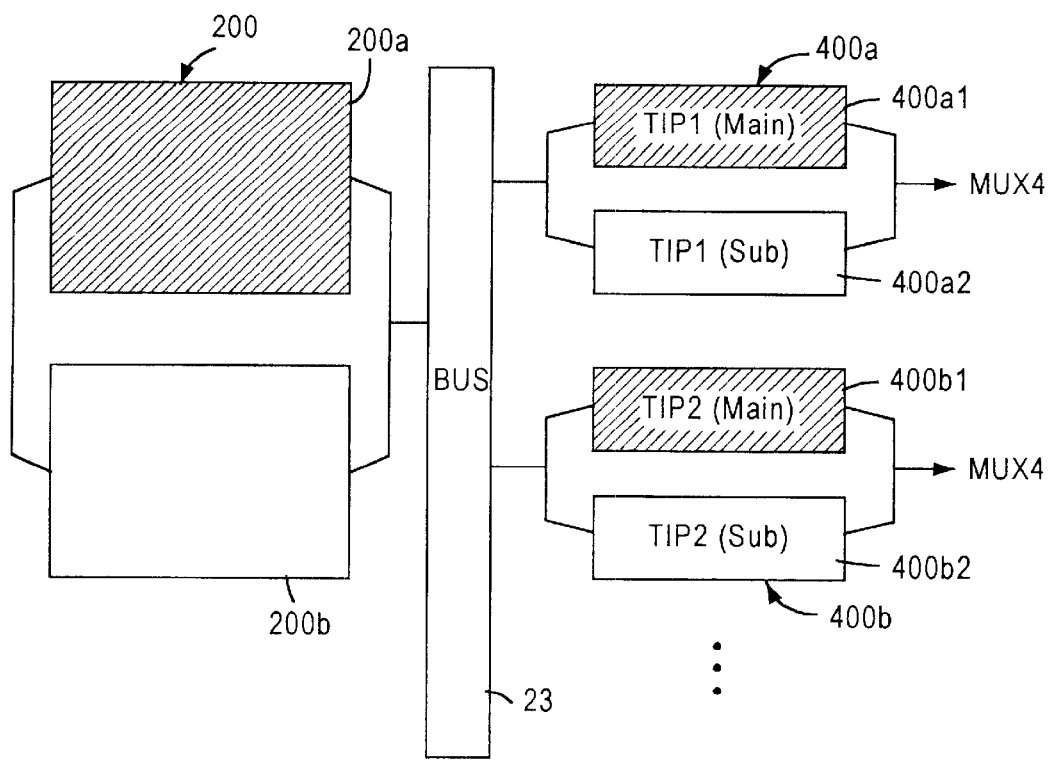
FIG. 33 is a block diagram which shows a control information generator according to the fourth embodiment of the invention.

FIG. 33 shows a control information generator 20 according to the fourth embodiment of the invention.

The control information generating circuit 200 includes main and sub-control information generating units 200*a* and 200*b* which are dependent in hardware from each other and each of which may have the same circuit structure as the control information generating circuit 200 of one of the above embodiments. The main and sub-control information generating units 200*a* and 200*b* have a common table for management of version numbers. Thus, even when it is required to switch the main control information generating unit 200*a* in operation to the sub-control information generating unit 200*b*, and vice versa as requested due to a failure of either of the control information generating units 200*a* and 200*b*, for example, the version number matching is established.

The control information outputting unit 400*a* includes main and sub-control information outputting sections 400*a*1 and 400*a*2 which are dependent in hardware from each other. Similarly, the control information outputting units 400*b* and 400*c* include main and sub-control information outputting sections 400*b*1 and 400*b*2 and main and sub-control information outputting sections 400*c*1 and 400*c*2, respectively. Each of the control information outputting sections 400*a*1 to 400*c*2 may have the same circuit structure as the control information outputting units 400*a* to 400*c* of one of the above embodiments. The main and sub-control information outputting sections of each of the control information outputting units 400*a* to 400*c* both operate at all times and are designed to switch outputs to the multiplexer 4 selectively. Thus, even if an output from each of the control information outputting units 400*a* to 400*c* is switched from the main to the sub-control information outputting sections, the version number matching is established.

Specifically, the control information generating circuit 200 may perform the independent operations through the main and sub-control information generating units 200*a* and 200*b*. Similarly, each of the control information outputting circuit 400*a* to 400*c* may perform the independent operations through the main and sub-control information outputting sections. The operational combinations will thus be 2×2=4, thereby resulting in greatly improved reliability of the system in case of failures in operation due to hardware defects of either of the main and sub-control information generating units and/or either of the main and sub-control information outputting sections.

Figure 34:
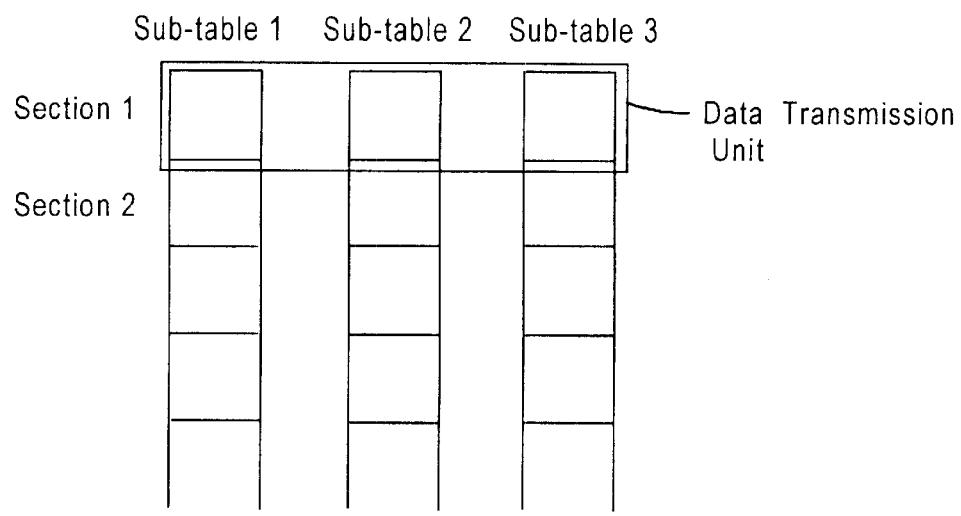
FIG. 34 is an illustration which shows a multi-section format according to the fifth embodiment of the invention.

A control information generator 20 according to the fifth embodiment of the invention will be described with reference to FIG. 34 which may have either of the. circuit structures as shown in FIGS. 22 and 30 and which is designed to collect sections of sub-tables into a plurality of blocks for packetizing.

Typically, each table consists of a plurality of sub-tables. Each sub-table consist of a plurality of sections. In order to reduce a reception load of an IRD (Integrated, Receiver and Decoder), DVB/SI standards of EBU/ETSI prescribe that sections of the same sub-table be transmitted at intervals of 25 ms or more. In order to meet this requirement, a conventional system produces TS packets in units of sections of each sub-table which are arranged at intervals of 25 ms or more. However, since the TS packet is fixed in length, the last TS packet may have an unnecessary region, resulting in reduction in transmission efficiency.

The control information generating circuit 200 of this embodiment groups in the TS packetizing circuit 230 sections of the sub-tables to which the same section number is assigned and produces TS packets every group. Specifically, in FIG. 34, sections whose numbers are one (1) are collected from the sub-tables 1, 2, and 3 into one group which is, in turn, packetized. Similarly, sections whose numbers are two (2) are collected from the sub-tables 1 to 3 into one group which is, in turn, packetized.

The TS packets thus formed are transmitted from the output circuit 270 to the multiplexer 4 in units of the group at intervals of 25 ms or more under control of the scheduler 260. The sections of the same sub-table are, thus, transmitted at the intervals of 25 ms or more according to the DVB/SI standards.

However, packetizing all the tables in the above multisection format in the structure of FIG. 30 requires a large memory capacity in the control information generating circuit 200 for storing some of the tables which are changed in version frequently. In order to avoid this problem, the TS packetizing circuit 230 packetizes some of the tables having versions of a number smaller than a given value, while it produces packetizing schedules for the other tables having a larger number of versions without packetizing them and transmits the packetizing schedules to the control information outputting circuit 400. The control information outputting circuit 400 packetizes the unpacketized tables according to the packetizing schedules. This enables high-speed transmission of table information with increased efficiency of packetizing.

A control information generator 20 according to the sixth embodiment of the invention will be described with reference to FIGS. 35 and 36 which is a modification of the fifth embodiment in FIG. 34.

The control information generator 20 of this embodiment is, as can be seen from the drawing, designed to collect sections of the sub-tables into blocks in units of transmission data and packetize the sections in each block in the multisection format. In this case, if one of sections in the TS1 (i.e., a transport stream 1) is altered, all data, as enclosed by a broken line in FIG. 36, needs to be packetized again.

Figure 35:
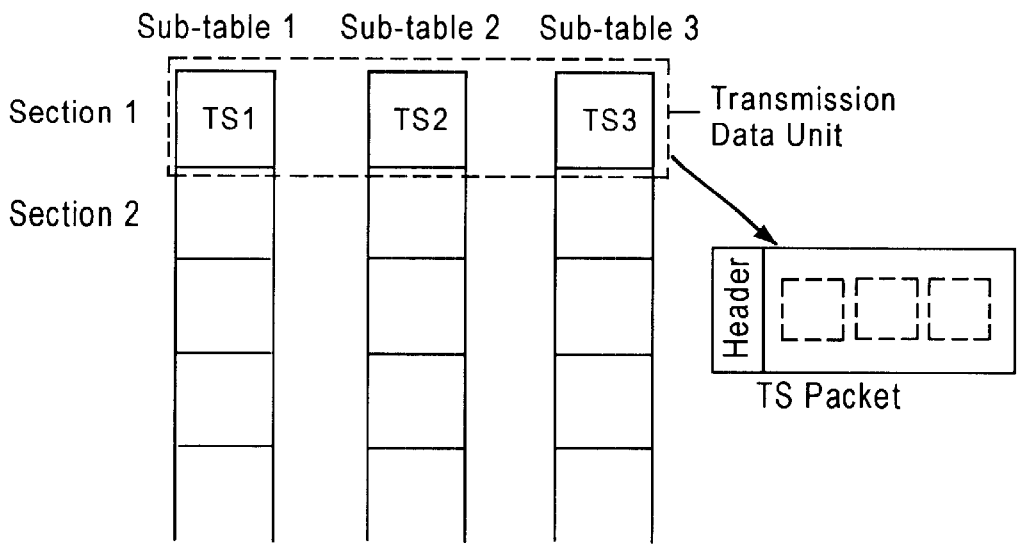
FIG. 35 is an illustration which shows a multi-section format according to the sixth embodiment of the invention.
Figure 36:
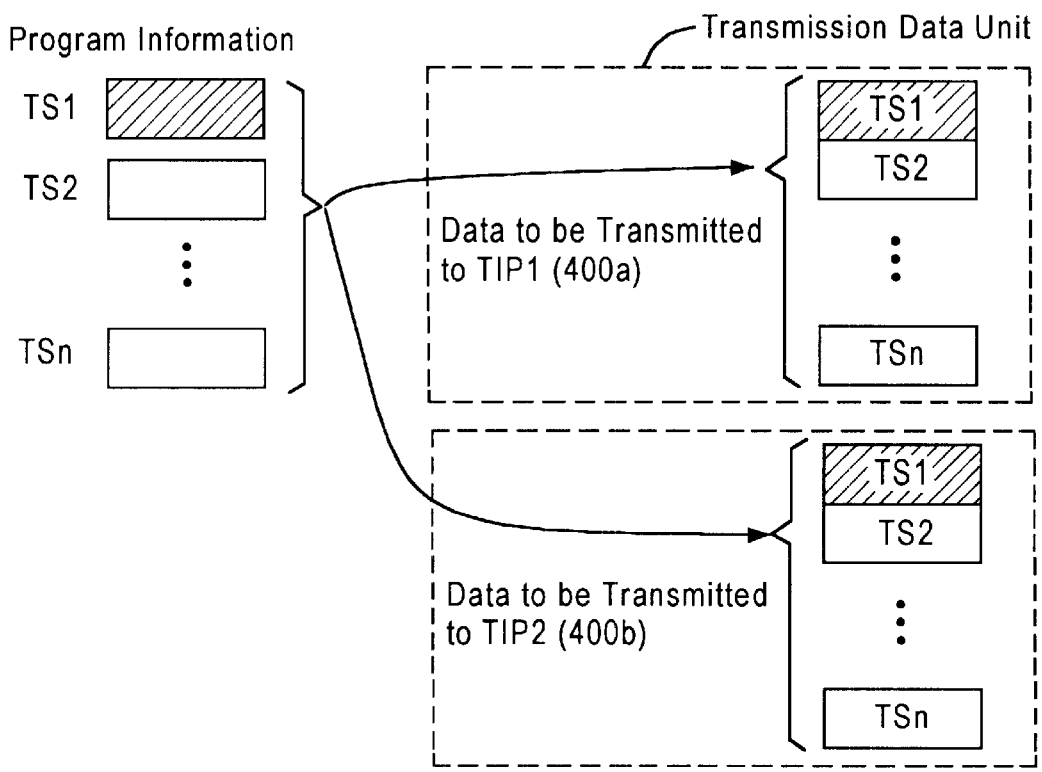
FIG. 36 is an illustration which shows a structure wherein TS packets prepared in the multi-section format in FIG. 35 are transmitted to control information outputting units 400a and 400b.
Figure 37:
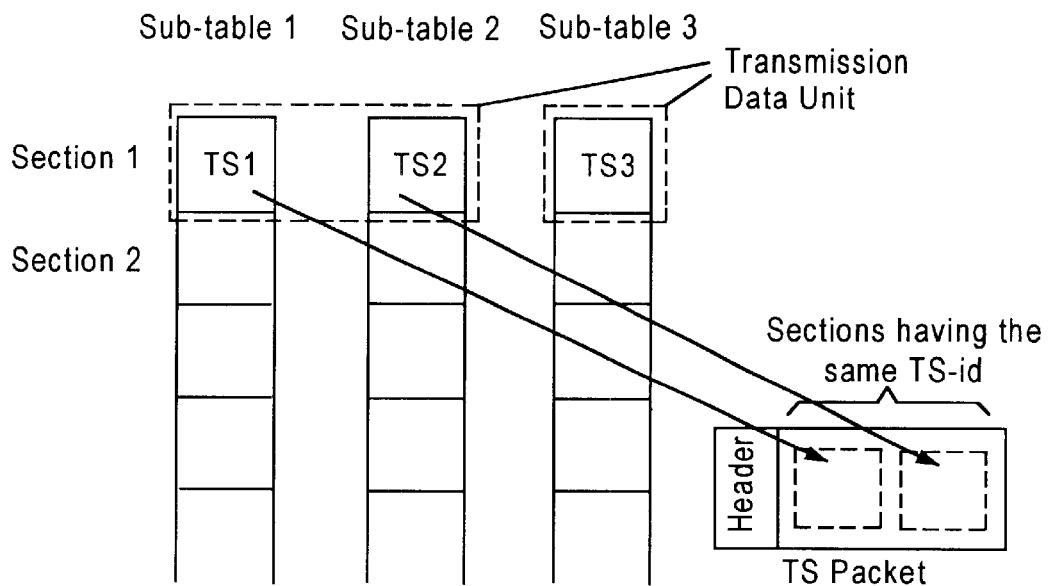
FIG. 37 is an illustration which shows a multi-section format in units of a section number.
Figure 38:
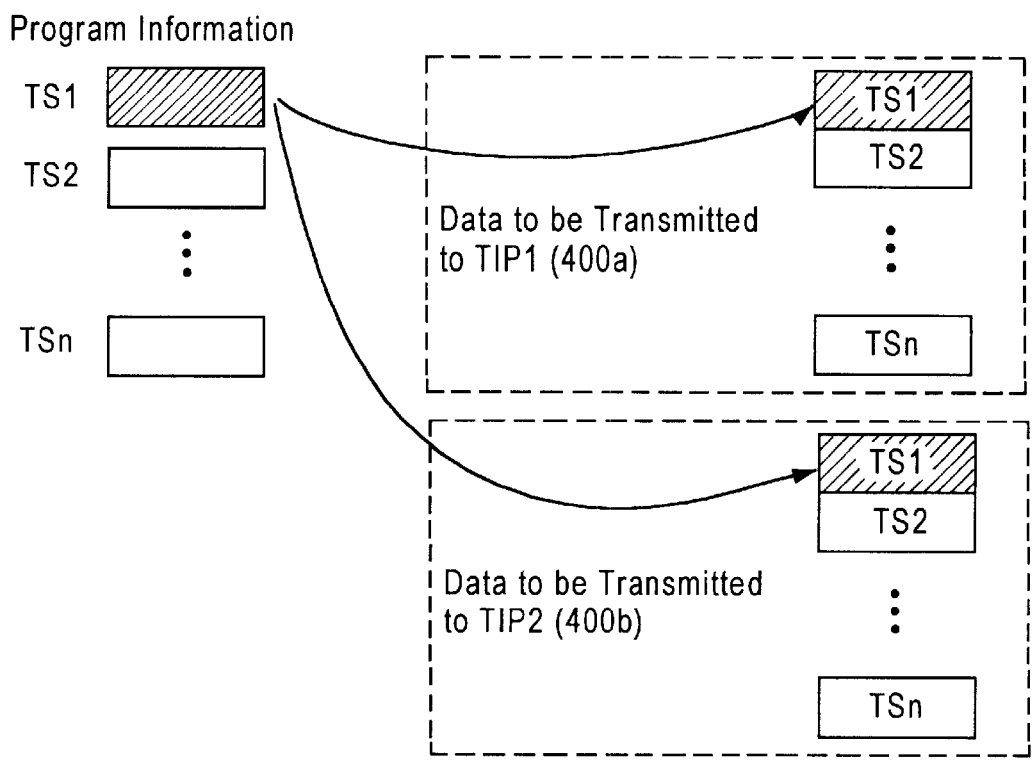
FIG. 38 is an illustration which shows a structure wherein TS packets prepared in the multi-section format in FIG. 37 are transmitted to control information outputting units 400a and 400b.

FIGS. 37 and 38 show a modification of the multi-section format shown in FIGS. 35 and 36 which is designed to collect sections of sub-tables having the same TS-identification number into one block. Specifically, the control information generator 20 packetizes the sections of the sub-tables in units of a transport stream (TS) in the multi-section format. In this case, if one of sections in the TS1 is altered, only the TS1 may be re-packetized, thereby enabling the partial compiling.

Figure 39:
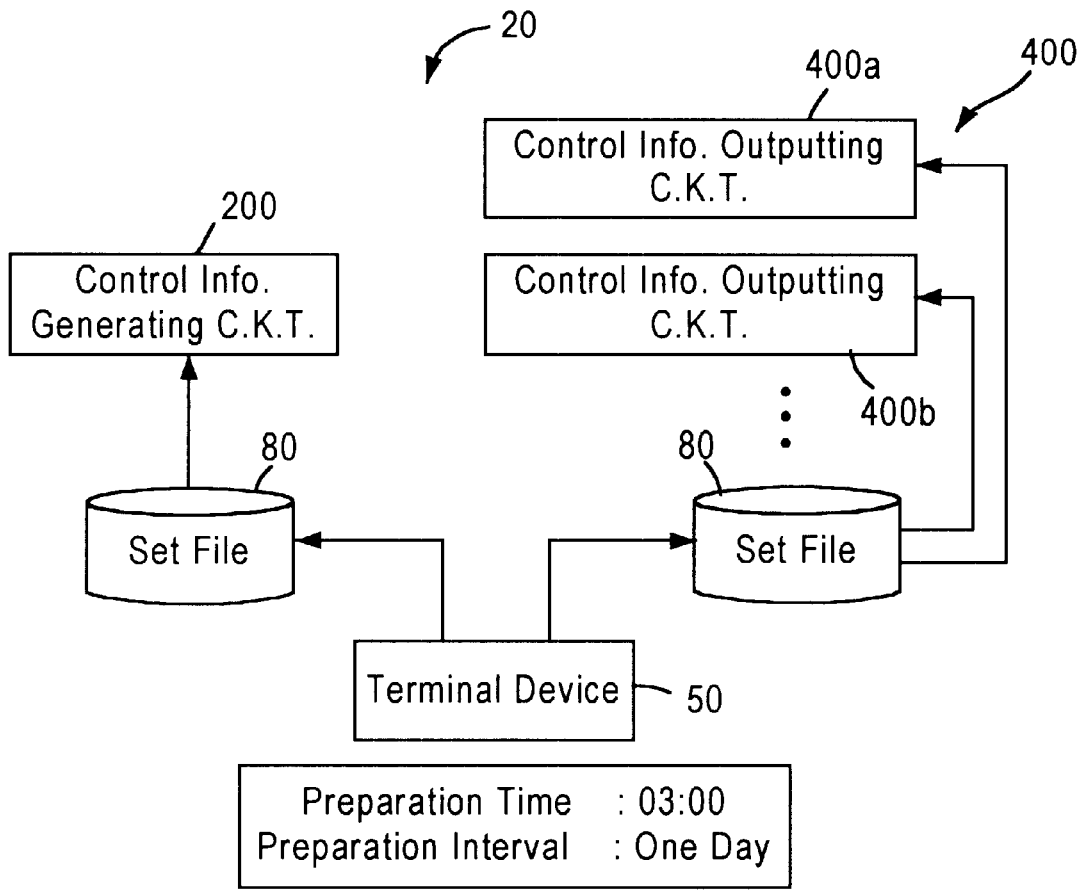
FIG. 39 is a block diagram which shows a control information generator according to the seventh embodiment of the invention.

FIG. 39 shows a control information generator 20 according to the seventh embodiment of the invention which is designed to receive set files 80, as will be described later in detail, manually inputted through the terminal device 50. The control information generating circuit 200 and the control information outputting circuit 400 may have the structures shown in either of FIGS. 22 and 30, respectively. The set files 80 store data on control information to be prepared by the control information generating circuit 200. The shown structure allows the control information to be prepared in the control information generating circuit 200 for a required period of time plus an additional time. Within the additional time, data which will not be transmitted actually (i.e., spare table information) from the control information outputting circuit 400 is prepared and stored in the control information outputting circuit 400 for use if a failure in transmission between the control information generating circuit 200 and the control information outputting circuit 400 or a hard disc malfunction in the control information generating circuit 200 occurs. For example, when today's table information and tomorrow's table information were prepared yesterday, and when tomorrow's table information and day after tomorrow's table information are prepared today, the tomorrow's table information prepared yesterday is not transmitted from the control information outputting units 400a to 400c, but may be used as spare table information which is to be transmitted if any of the control information outputting units 400a to 400c fails.

Figure 40:
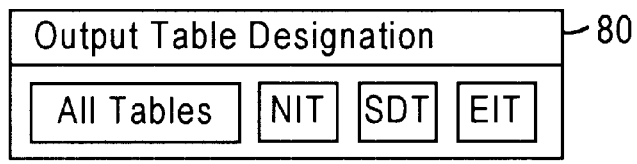
FIG. 40 is an illustration which shows an output table designation file used in set files in FIG. 39.

FIG. 40 shows an output table designation file that is used in both the set files 80, as shown in FIG. 39. The output table designation file stores therein information that designates a table to be outputted from each of the control information outputting units 400a and 400b. For example, a command may be issued for either or both of the control information outputting units 400a and 400b through an interface to output only a network information table (NIT) for an operation test.

FIG. 41 shows a transport stream-assigning file which is used in both the set files 80, as shown in FIG. 39. The transport stream-assigning file indicates one of the control information outputting units 400a to 400c to which each TS is to be assigned. The assigning of each TS may be altered automatically only by changing the transport stream-assigning file. The control information generating circuit 200 can read the transport stream-assigning file every preparation of the control information to take measures to meet a structure change of the control information outputting circuit 400 or a TS without changing a program in the control information generating circuit 200.

FIG. 42 shows a transmission cycle file which is used in both the set files 80, as shown in FIG. 39. The transmission cycle file lists a cycle of transmission of tables through each transponder. For example, an EPG transponder which transfers a master EPG transmits tables in a shorter cycle, while BASIC transponders transmits tables in a longer cycle. The transmission cycle file may also include a transmission bandwidth for each transponder or for each service (i.e., channel). For example, the transmission bandwidth for a specified channel may be increased more than other channels to allow the specified channel to be switched quickly by, for example, a TV remote controller and to transmit more information. This function is performed to establish the priority on each service.

FIG. 43 shows a dummy TS file which is one of the set files 80, as shown in FIG. 39, connected to the control information generating circuit 200. The dummy TS file 80 provides an analog TS number as a dummy TS for transmitting a TV program schedule of an analog TS on a digital TS. For example, when it is required to broadcast only SI of another network such as a TV program schedule in analog form at a channel of a digital TV, the dummy TS number is assigned to specified one of the control information outputting units 400a to 400c. The control information generating circuit 200 stops outputting the control information to the specified one of the control information outputting units 400a to 400c to allow it to transmit the TV program schedule of another network.

FIG. 44 shows a modification of the seventh embodiment. The control information generating circuit 200 is responsive to a non-output command issued from the terminal device 50, as shown in FIG. 22, to prepare the control information without outputting it to the control information outputting circuit 400 and to return only results of preparation of the control information to the broadcast database 1. This is used for pre-checking input data.

Figure 45:
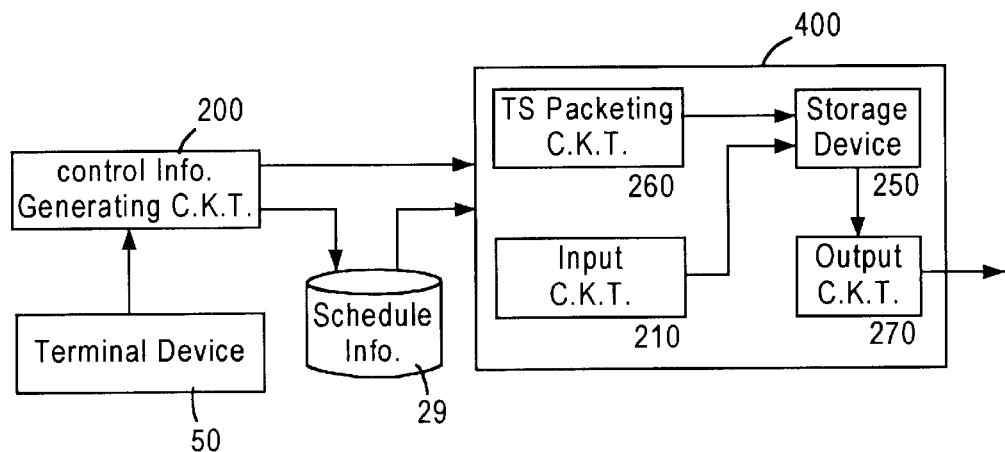
FIG. 45 is an illustration which shows a second modification of the seventh embodiment.

FIG. 45 shows a second modification of the seventh embodiment. The control information outputting circuit 400 is responsive to an output time designation signal inputted from the terminal device 50, as shown in FIG. 22, through the control information generating circuit 200 to transmit the control information. Specifically, a new TV program schedule may be transmitted at designated date and time.

Figure 46:
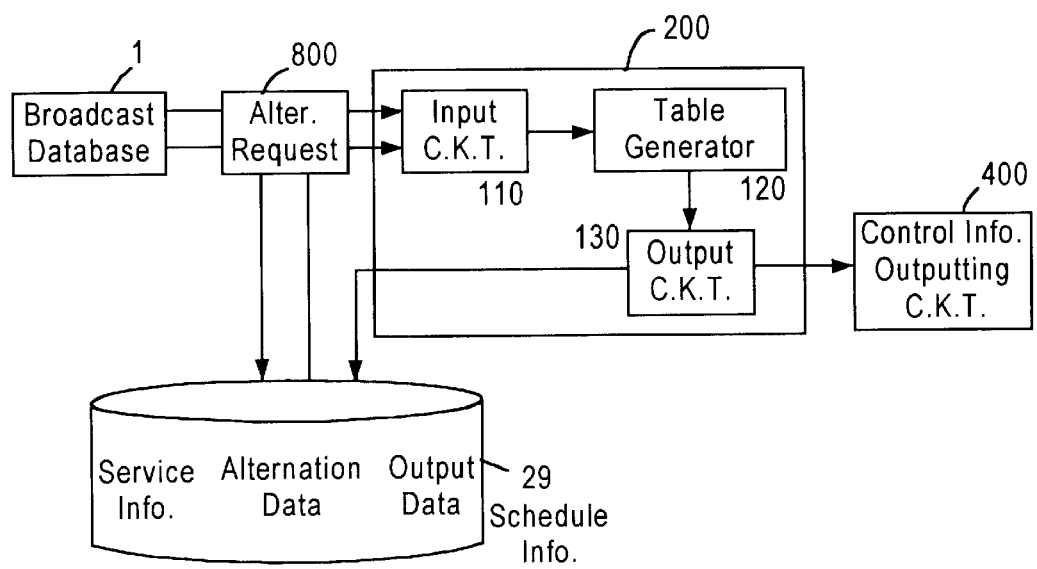
FIG. 46 is a block diagram which shows a control information generator according to the eighth embodiment of the invention.

FIG. 46 shows a control information generator 20 according to the eighth embodiment of the invention.

The control information generator 20 includes an urgent alternation requesting circuit 800 which is designed to transfer an urgent alternation request signal from the broadcast database 1 to the control information generating circuit 200 to prohibit preparation of the control information for altering the control information. The control information can be altered before outputted from the control information generating circuit 200. Each of the control information outputting units 400a to 400b includes the version management circuit 220, thereby allowing the control information generating circuit 200 to suspend the preparation of the control information for altering the control information according to the urgent alternation request signal from the broadcast database 1. This is because if the version management circuit 220 is provided in the control information generating circuit 200 and has assigned the version number to the control information being prepared, it will preclude the control information alternation until the control information is outputted, and following control information starts to be prepared.

Figure 47:
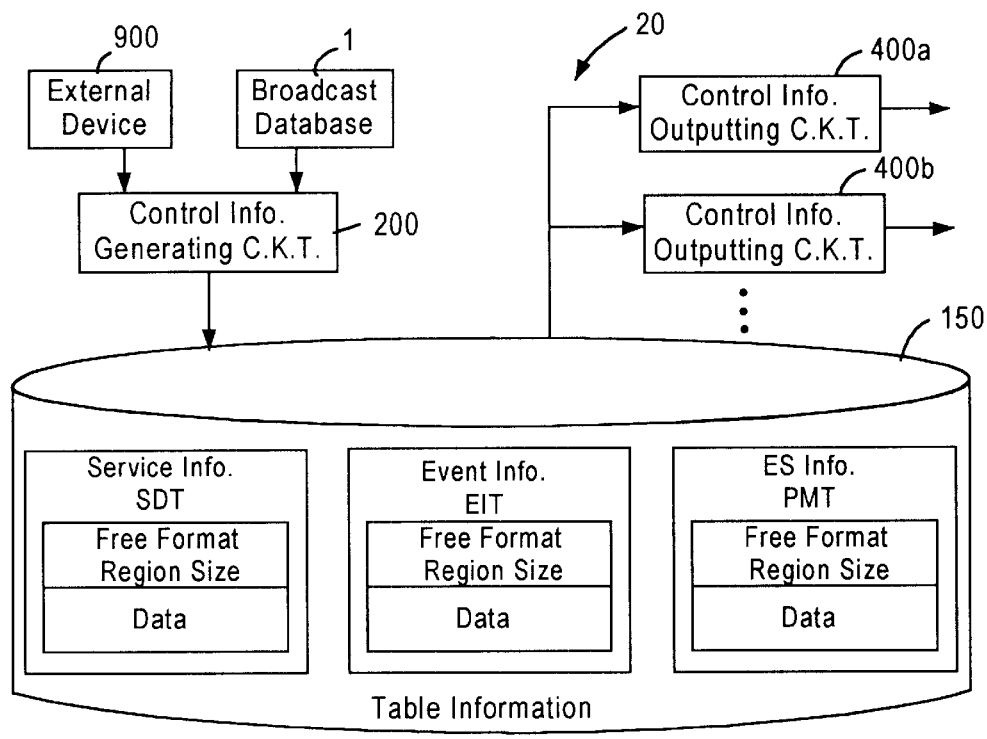
FIG. 47 is a block diagram which shows a control information generator according to the ninth embodiment of the invention.

FIG. 47 shows a control information generator 20 according to the ninth embodiment of the invention.

The control information generator 20 includes an external device 900 designed to produce data signals for data broadcasting. The table information 150 has free format regions formed in the control information, one for each of a service, an event, and an ES (Elementary Stream). This allows descriptors to be added, one for each of the service, the event, and the ES. For example, when data for data broadcasting is prepared through the external device 900 and inputted into a table, it may be transmitted with timing required by the external device 900 without analyzing the contents of the data through the control information generator 20 as long as a protocol is established between the external device 900 and a receiver. Even if a system requirement is changed, tables to be transmitted may be altered without modifying a compiler, thereby realizing interactive broadcasting in the IRD. In the drawing, "free format region size" represents information on the size of data written in the free format region.

Figure 48:
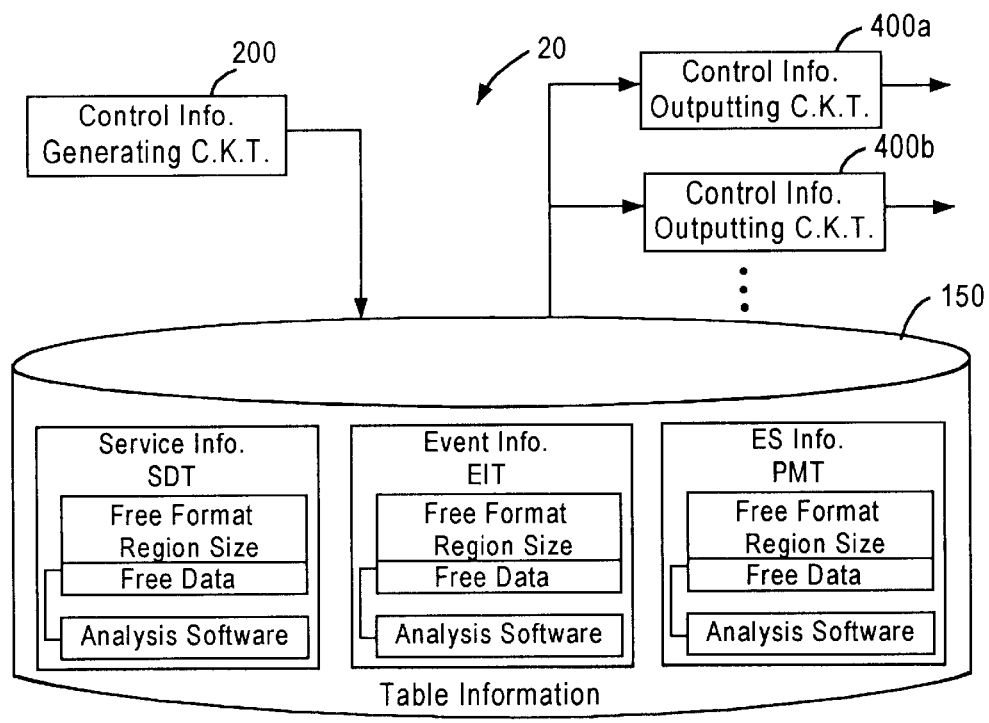
FIG. 48 is a block diagram which shows a modification of the control information generator of FIG. 47.

FIG. 48 shows a modification of the ninth embodiment. The table information 150 has table analysis information regions for storing therein analysis software (i.e., table analysis information) for analysis of tables prepared in free formats. The table analysis information is inputted to each of the control information outputting circuit 400a and 400b along with each table. This eliminates the need for fixing formats of all tables in advance, thereby allowing formats of all tables to be determined through an external device.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A control information generating apparatus for use in a broadcast system comprising:
    a broadcast database having program information stored therein,
    an audio/video data transmitter that is adapted to receive a program schedule and audio/video data from the broadcast database and is adapted to transmit a data signal thereof, and
    a multiplexer, comprising:
        a control information generating circuit that is adapted to receive program schedule information, related to a program, from the broadcast database to generate control information on the program and that is adapted to output a signal containing the control information; and
        a control information outputting circuit that is adapted to receive the signal containing the control information from said control information generating circuit and is adapted to output the control information to the multiplexer in which the control information and the data signal from the audio/video data transmitter are adapted to be multiplexed
    wherein said control information generating circuit includes:
        an input circuit that receives the program schedule information from the broadcast database,
        a version generator, including a version skip detector circuit that is adapted to detect a skip in version numbers, that is adapted to receive the program schedule information from the input circuit, is adapted to generate table information, and is adapted to assign a version number to the table information,
        wherein the version generator is adapted to section a schedule database, prepared by the input circuit, into units of a table to produce table information elements and is adapted to assign at least one consecutive version number to each of the table information elements,
        a TS packetizing circuit that is adapted to packetize the table information outputted from the version generator,
        a bandwidth adjuster, that is adapted to determine a transmission cycle of the table information, and is adapted to adjust a transmission bandwidth of the table information so that all the table information may be transmitted, and
        an output circuit that is adapted to output the table information to said control information outputting circuit.

2. A control information generating apparatus as set forth in claim 1, wherein the broadcast system is a digital broadcast system, and wherein said control information outputting circuit includes an input circuit which receives the control information outputted from said control information generating circuit, a storage device which stores the control information in a grouped table form, an output circuit which outputs the control information stored in the storage device, and a scheduler which controls timing where the control information is outputted from the storage device to the output circuit.

3. A control information generating apparatus as set forth in claim 1, wherein when the program schedule information consists of both a PSI (Program Specific Information) source and an SI (Service Information) source, said control information generating circuit produces PSI and SI as the control information, and wherein when the program schedule information consists of only the PSI source, said control information generating circuit produces only the PSI without providing dummy SI which is empty.

4. A control information generating apparatus as set forth in claim 1, wherein the program schedule information is provided in units of a file containing programs for one day broadcasting through all services.

5. A control information generating apparatus as set forth in claim 2, wherein said control information outputting circuit includes a plurality of control information outputting units, and wherein the control information outputting units are controlled so that the control information being transmitted currently will be updated simultaneously at a switching time that is a current time plus a marginal time.

6. A control information generating apparatus as set forth in claim 1 wherein the bandwidth adjuster includes a bandwidth adjustment table for determining a bandwidth adjustment range, and for changing the degree of bandwidth adjustment according to a property of each table of the table information.

7. A control information generating apparatus as set forth in claim 1, wherein from some of the table information elements having the different version numbers which are to be transmitted within a given period of time, one having the greatest amount of data is extracted as an object of determination of the transmission cycle.

8. A control information generating apparatus as set forth in claim 2, wherein said control information generating circuit classifies the control information to be stored in the storage device of said control information outputting circuit into groups in units of a transmitted data element according to one of a transmission cycle and an information updating time.

9. A control information generating apparatus as set forth in claim 1 wherein the table information is supplied from said control information generating circuit in a grouped table form.

10. A control information generating apparatus as set forth in claim 2, wherein the storage device includes a pre-storage, a post-storage, and a table combiner, the pre-storage storing therein the table information in units of a table, the table combiner combining tables stored in the pre-storage into table groups a preselected time before the table groups are outputted from the output circuit, the post-storage storing therein the table groups provided by the table combiner.

11. A control information generating apparatus as set forth in claim 2, wherein the storage device includes a pre-storage, a post-storage, and a table combiner, the pre-storage storing therein the table information in units of a table, the table combiner combining some of tables into table groups a preselected time before all table groups are outputted from the output circuit, the post-storage storing therein the table groups provided by the table combiner.

12. A control information generating apparatus as set forth in claim 8, wherein the control information includes tables each consisting of sub-tables each consisting of sections, and wherein the transmitted data element in each of the groups consists of the sections having the same section number, and wherein the transmitted data elements are transmitted at given time intervals.

13. A control information generating apparatus as set forth in claim 2, wherein the output circuit includes a plurality of cues having different output priorities, respectively, each cue storing therein the control information in table form, the output circuit reading tables out of one of the cues having a higher degree of output priority.

14. A control information generating apparatus for use in a broadcast system comprising:
   a control information generating circuit that is adapted to receive program schedule information on a program to generate control information on the program and is adapted to output a signal indicative of the control information, said control information generating circuit including:
   input circuit adapted to receive schedule information,
   a table preparing circuit adapted to prepare table information as the control information based on program schedule information,
   a version management circuit adapted to assign at least one consecutive version number to the table information prepared by the table preparing circuit,
   a TS packetizing circuit adapted to packetize the table information to which a version number has been assigned,
   a bandwidth adjusting circuit adapted to determine a transmission bandwidth and a transmission cycle of the table information, and
   an output circuit for said generated control information, adapted to output a signal indicative of the table information; and
   control information outputting circuits each including:
      an input circuit adapted to receive the signal indicative of the table information from said control information generating circuit,
      a storage device adapted to store therein the table information inputted through the input circuit,
      a scheduler adapted to control the timing of the output, of the table information stored in the storage device, from the output circuit according to the transmission cycle determined by the bandwidth adjusting circuit of said control information generating circuit, and
      an output circuit,
      wherein:
         the table preparing circuit is adapted to prepare table information elements, in sequence, as the control information,
         the version management circuit is adapted to assign at least one consecutive version number, in sequence, for each of the table information elements,
         the output circuit of said control information generating circuit being adapted to output signals indicative of the table information elements to said control information outputting circuits, and
         wherein, when a version number skip has occurred when the version management circuit assigns the version numbers to the table information elements, the version management circuit is adapted to determine the greatest version number that was last successfully assigned to the table information element supplied to said control information outputting circuits, and a version number following the omitted one of the consecutive version numbers as a maximum value and the smaller thereof as an initial value, and is adapted to reassign one of the consecutive version numbers between the initial value and the maximum value, in sequence, to the table information element where the version number skip has occurred.

15. A control information generating apparatus as set forth in claim 14, further comprising a plurality of transponders, and wherein a control information outputting circuit is provided, one for each transponder.

16. A control information generating apparatus as set forth in claim 14, wherein when it is impossible for the version management circuit to know the version number to be assigned to the table information, the version management circuit assigns the consecutive version numbers, in sequence, to the table information from first one of the consecutive version numbers and outputs the table information through the output circuit in sequence.

17. A control information generating apparatus as set forth in claim 14, wherein the table preparing circuit is adapted to prepare table information elements, in sequence, as the control information, the version management circuit is adapted to assign consecutive version numbers, in sequence, at least one for each of the table information elements, the output circuit of said control information generating circuit is adapted to output signals indicative of the table information elements to said control information outputting circuits, and wherein the version management circuit is adapted to determine a period of time during which it is possible for the input circuit of each of said control information outputting circuits to receive the table information elements to which one following a version number assigned to the information element being received currently by the input circuit, is assigned, the version management circuit is adapted to determine that a version number skip will occur in the table information elements when outputted from the output circuit of each of said control information outputting circuits if the input circuit has not received, within the determined period of time, the table information element to which the one following the version number assigned to the information element being received currently by the input circuit is assigned.

18. A control information generating apparatus as set forth in claim 14, wherein:
   the table preparing circuit is adapted to prepare table information elements, in sequence, as the control information,
   the version management circuit is adapted to assign the consecutive version numbers, in sequence, at least one for each of the table information elements,
   the output circuit of said control information generating circuit is adapted to output signals indicative of the table information elements to said control information outputting circuits, and
   wherein the version management circuit is adapted to determine a period of time during which it is possible for the input circuit of each of said control information outputting circuits to receive the table information element to which one following a version number assigned to the information element being received currently by the input circuit is assigned, the output circuit of said control information generating circuit being adapted to determine that a version number skip will occur in the table information elements when outputted from the output circuit of each of said control information outputting circuits if the output circuit of said control information generating circuit has not outputted within the determined period of time the table information element to which the one following the version number assigned to the information element being received currently by the input circuit of each of said control information outputting circuits is assigned.

19. A control information generating apparatus as set forth in claim 14, wherein the table information includes sub-tables each consisting of section(s), and wherein the TS packetizing circuit is adapted to assign the sections of one of the sub-tables to different groups, respectively, and is adapted to packetize the sections in each of the groups.

20. A control information generating apparatus as set forth in claim 19, wherein the scheduler of each of said control information outputting circuits ensures minimum transmission intervals at which the table information is transmitted from each of said control information outputting circuits in units of the groups.

21. A control information generating apparatus as set forth in claim 19, wherein the sections of the sub-tables are grouped in units of a section number.

22. A control information generating apparatus as set forth in claim 14, wherein the TS packetizing circuit is adapted to determine whether the table information has versions greater than a given value or not, when it is determined that the table information has versions greater than the given value, the TS packetizing circuit is adapted to provide a packetizing schedule to each of the control information outputting circuits without packetizing the table information, and wherein each of the control information outputting circuits is adapted to packetize the information table according to the packetizing schedule.

23. A control information generating apparatus as set forth in claim 20, wherein the table information includes sub-tables each consisting of sections, and wherein the TS packetizing circuit is adapted to assign the sections of the sub-tables to different groups in units of a transport stream and is adapted to packetize the sections in each of the groups.

24. A control information generating apparatus as set forth in claim 14, wherein the table preparing circuit is adapted to prepare the table information within a set time and is also adapted to prepare spare table information on a subsequent program within an additional time following the set time, and wherein each of said control information outputting circuits is adapted to store the table information and the spare table information.

25. A control information generating apparatus as set forth in claim 14, wherein the table information includes a plurality of table information elements, and further comprising means for designating one of the table information elements to be outputted from each of said control information outputting circuits.

26. A control information generating apparatus as set forth in claim 14, wherein the table information comprises a plurality of transport streams, and further comprises means for establishing a relation between one of the transport streams and each of said control information outputting circuits to specify one of said control information outputting circuits as being assigned to each of the transport streams.

27. A control information generating apparatus as set forth in claim 14, further comprising a plurality of transponders, and wherein one of said control information outputting circuits is provided for each transponder, and further comprising means for determining cycles of transmission of the table information from said control information outputting circuits in units of a transponder.

28. A control information generating apparatus as set forth in claim 14, wherein one of said control information outputting circuits is provided for each transponder, and further comprising means for determining bandwidths of transmission of the table information from said control information outputting circuits in units of a transponder.

29. A control information generating apparatus as set forth in claim 14, further comprising means for determining bandwidths of transmission of the table information from said control information outputting circuits in units of a service.

30. A control information generating apparatus as set forth in claim 14, further comprising means for providing a dummy transport stream to one of said control information outputting circuits to prohibit output of the table information therefrom, thereby allowing a TV program schedule of another network to be transmitted.

31. A control information generating apparatus as set forth in claim 14, wherein said control information generating circuit is adapted to receive the program schedule information from a broadcast database, and wherein said control information generating circuit is adapted to be responsive to a non-output command signal inputted from an external device to prepare and return the table information to the broadcast database without outputting the table information to said control information outputting circuits.

32. A control information generating apparatus as set forth in claim 14, wherein each of said control information outputting circuits is adapted to be responsive to an output time designation signal inputted from an external device to transmit the control information at designated date and time.

33. A control information generating apparatus as set forth in claim 14, wherein said control information generating circuit is adapted to receive the program schedule information from a broadcast database, and further comprising an urgent alternation requesting circuit that is responsive to an urgent alternation request signal from the broadcast database to prohibit preparation of the table information in said control information generating circuit for altering the table information.

34. A control information generating apparatus as set forth in claim 14, wherein the table information has regions that will accept elements in a plurality of formats.

35. A control information generating apparatus as set forth in claim 14, wherein the table information has table analysis information regions for storing therein table analysis information for analysis of table information elements of the table information prepared in different formats for allowing formats of all the table information elements to be determined through an external device without fixing the formats of all the table information elements in advance.

* * * * *

UNITED STATES PATENT AND TRADEMARK OFFICE
CERTIFICATE OF CORRECTION

PATENT NO.    : 6,505,347 B1
DATED         : August 20, 1998
INVENTOR(S)   : Shigeki Kaneko It is certified that error appears in the above-identified patent and that said Letters Patent is hereby corrected as shown below:

Column 29,
Line 22, please insert -- an -- before "input"

Column 30,
Line 38, please change "elements" to -- element, --

Signed and Sealed this

Twenty-third Day of September, 2003

JAMES E. ROGAN
*Director of the United States Patent and Trademark Office*